J. Q. A. NEWSOM.
LAND PLOWING, PULVERIZING, AND CULTIVATING MACHINE.
APPLICATION FILED APR. 25, 1904.
980,881.
Patented Jan. 3, 1911.
11 SHEETS—SHEET 2.
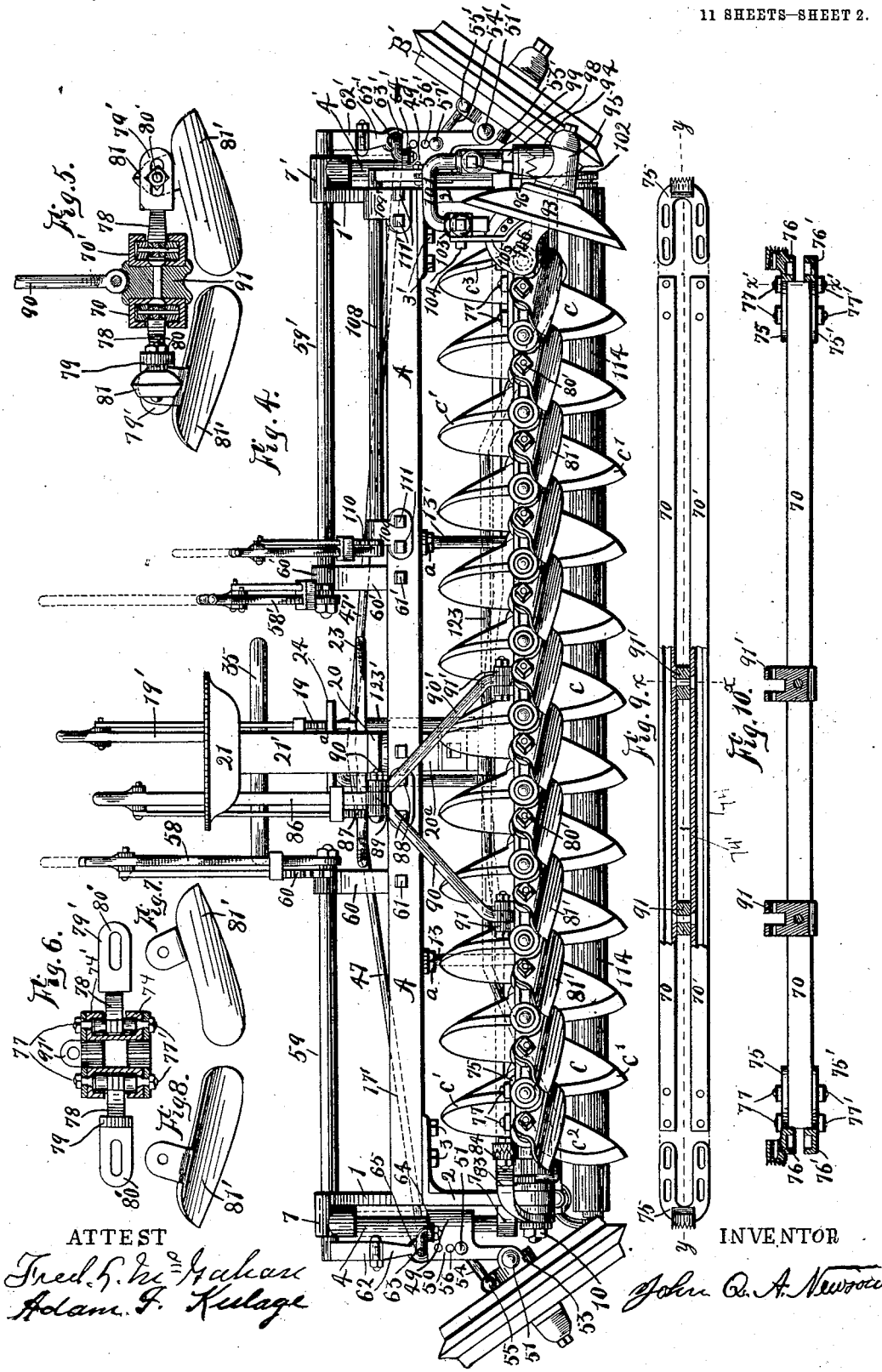
ATTEST
INVENTOR

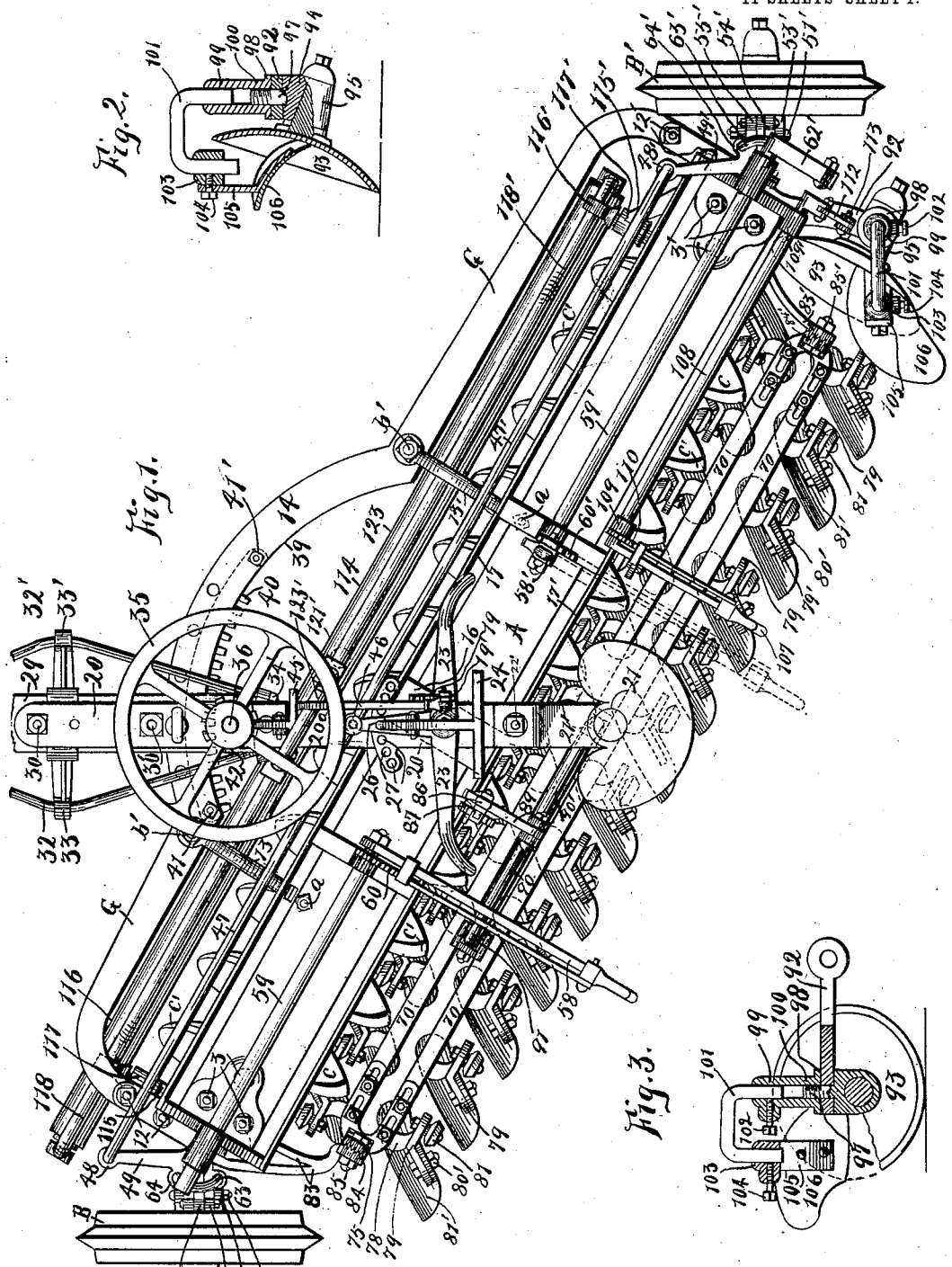

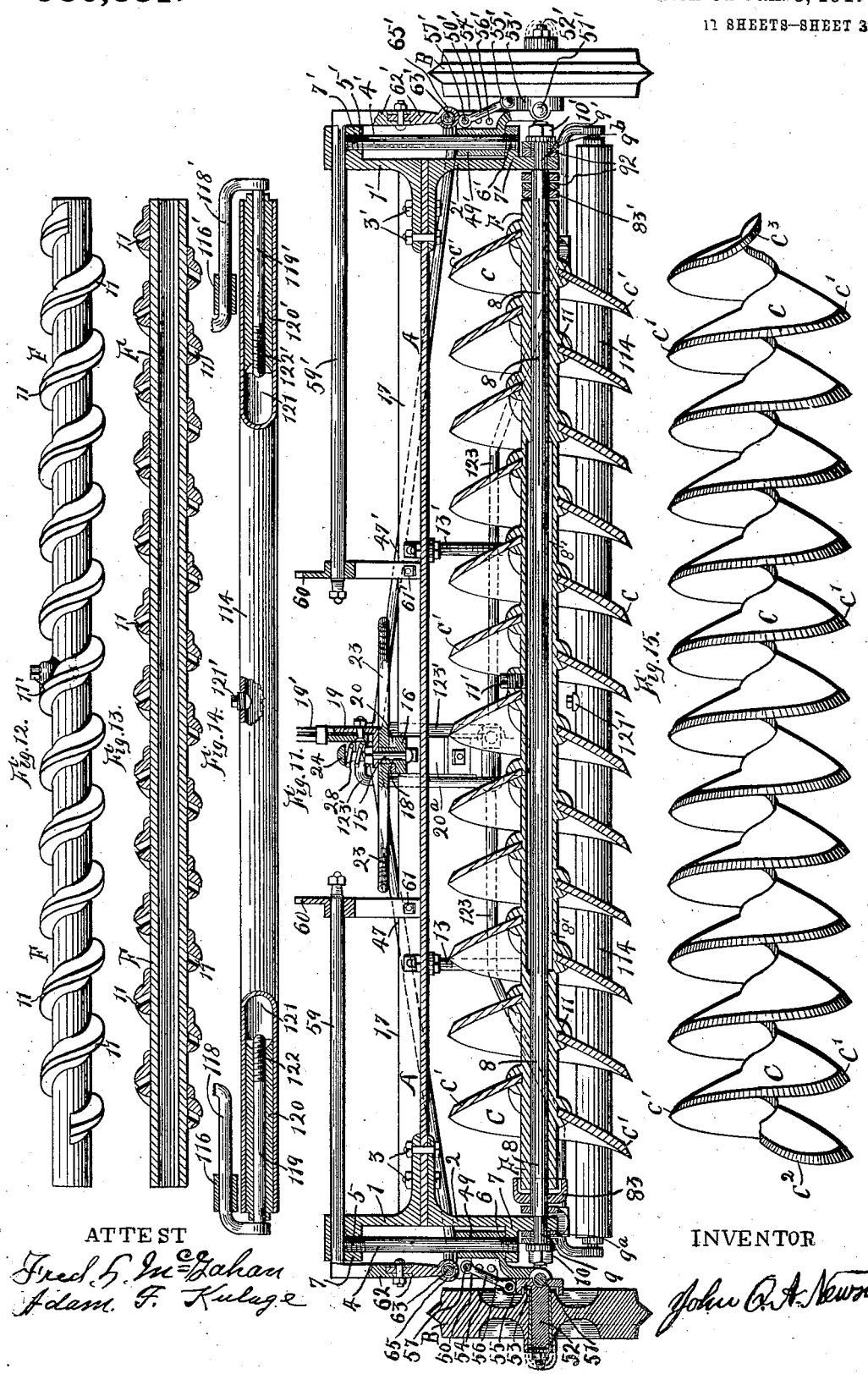

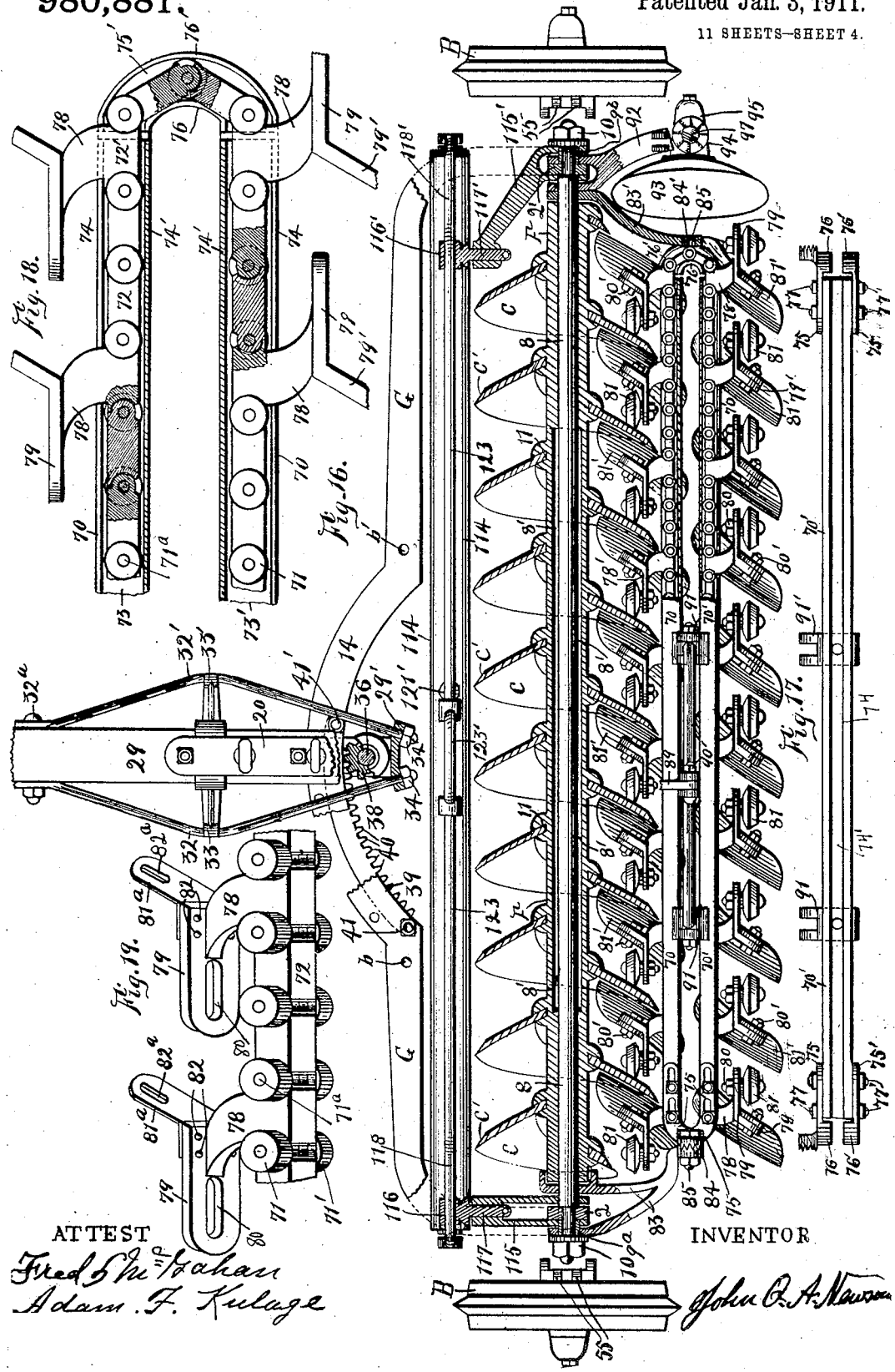

J. Q. A. NEWSOM.
LAND PLOWING, PULVERIZING, AND CULTIVATING MACHINE.
APPLICATION FILED APR. 25, 1904.
980,881.
Patented Jan. 3, 1911.
11 SHEETS—SHEET 5.
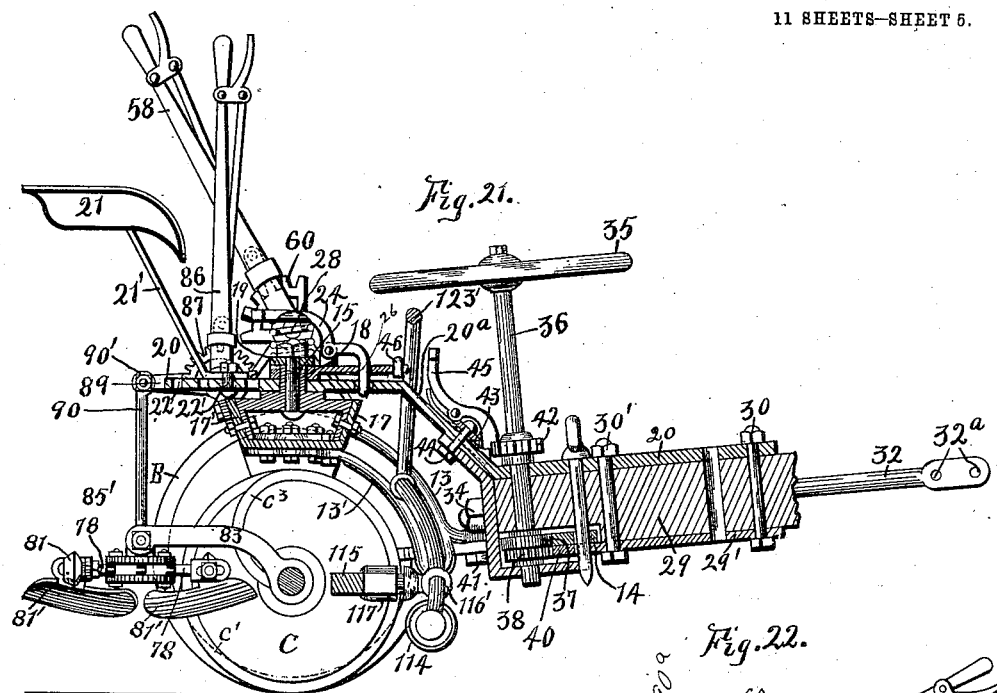
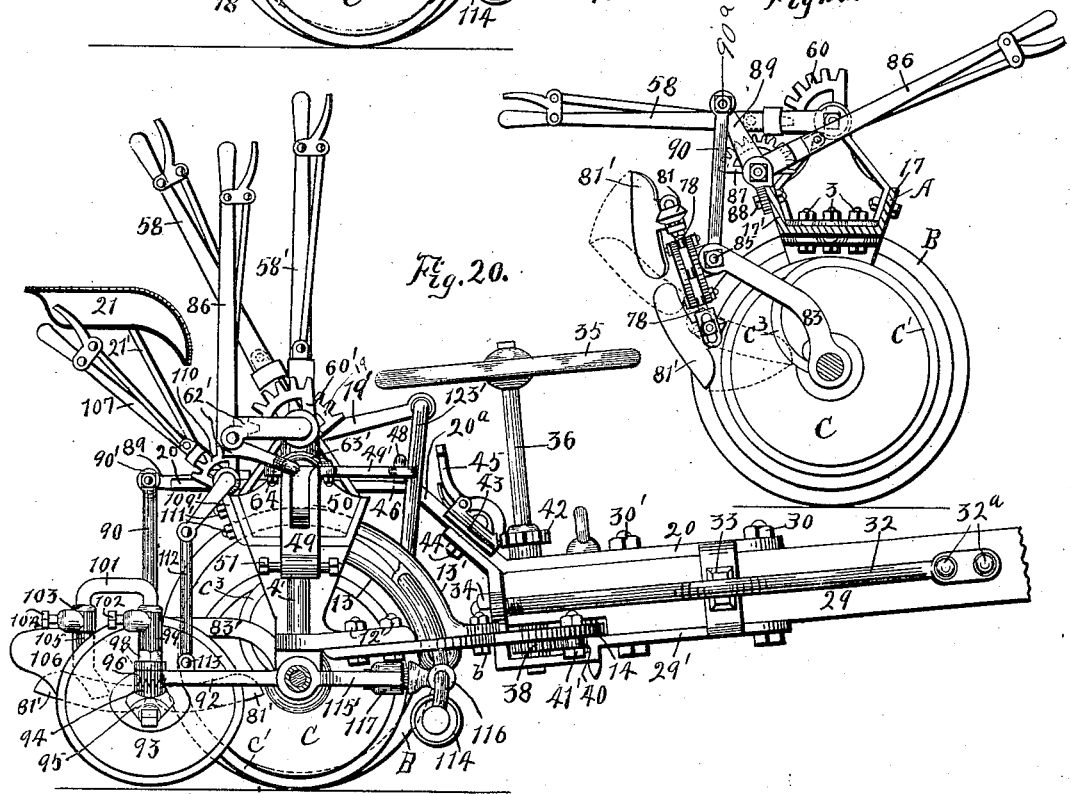
ATTEST
INVENTOR

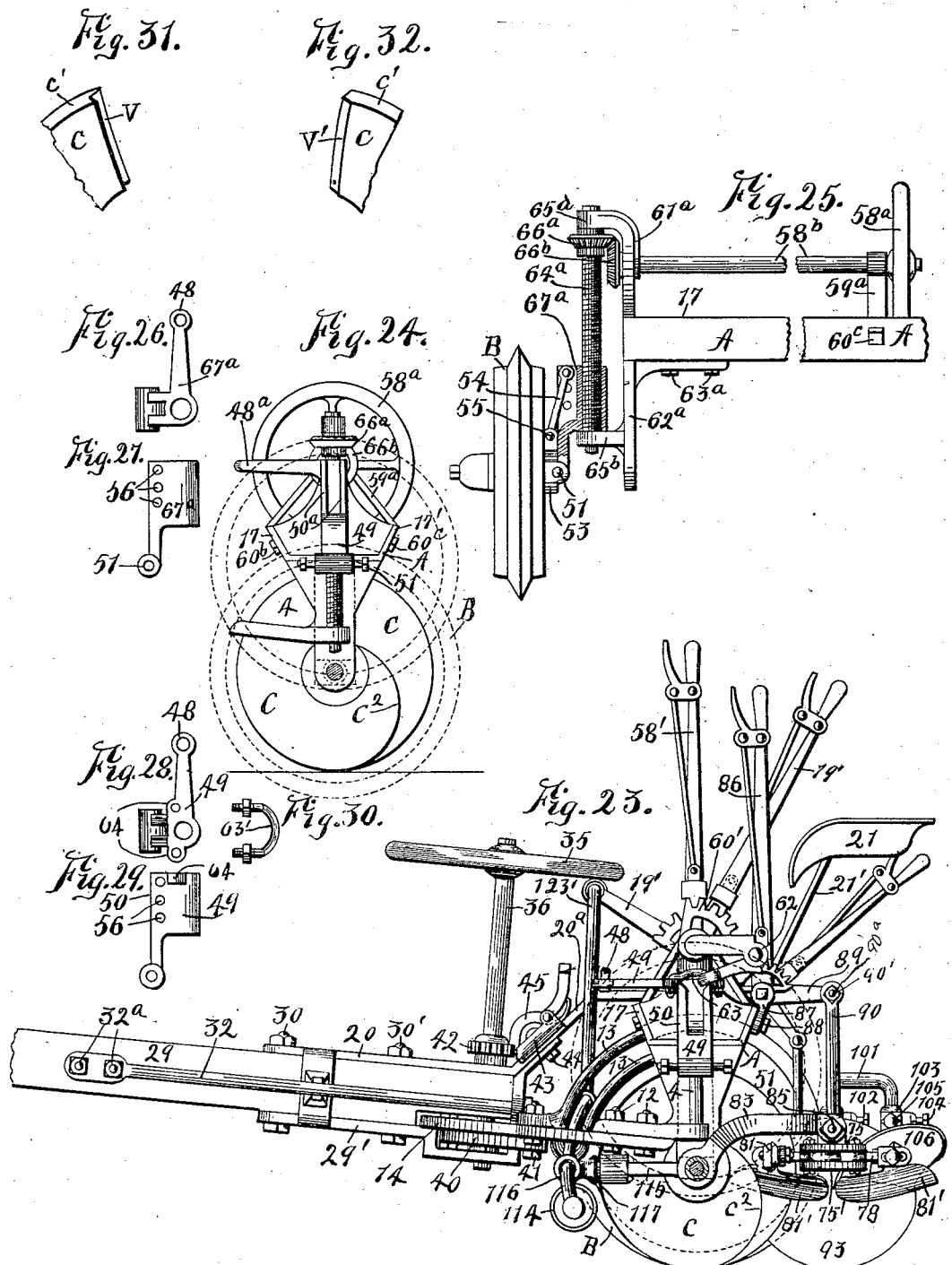

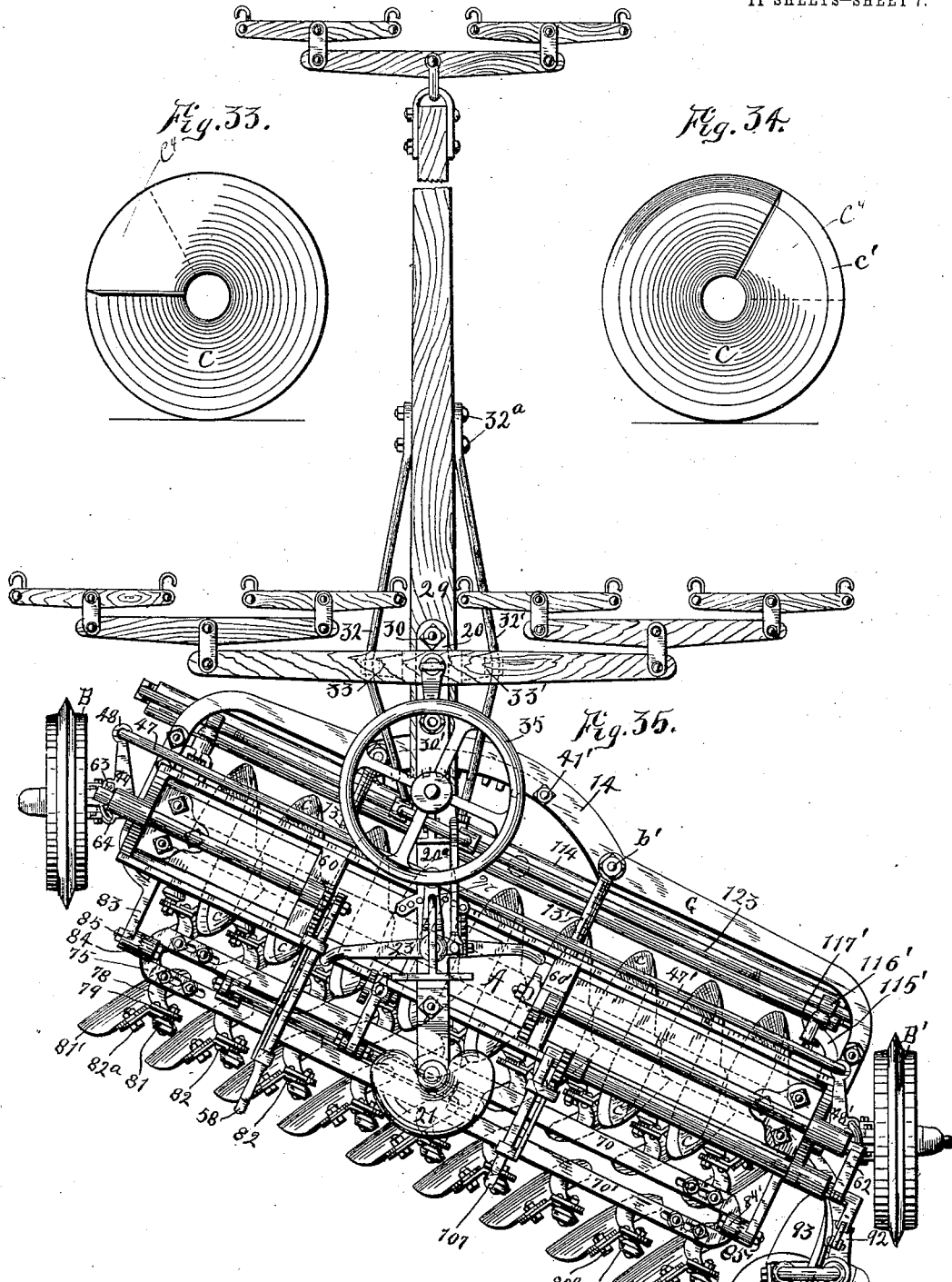

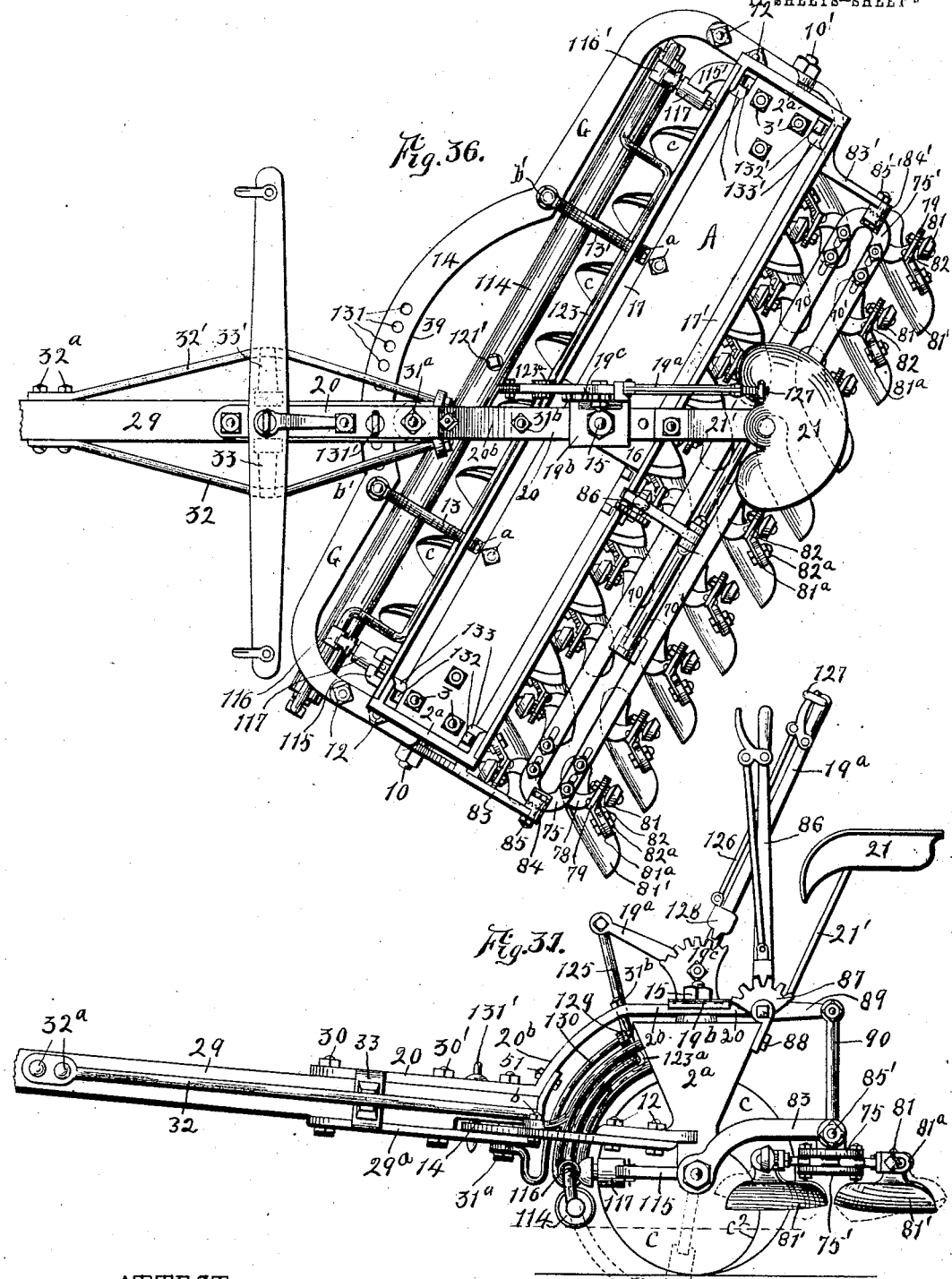

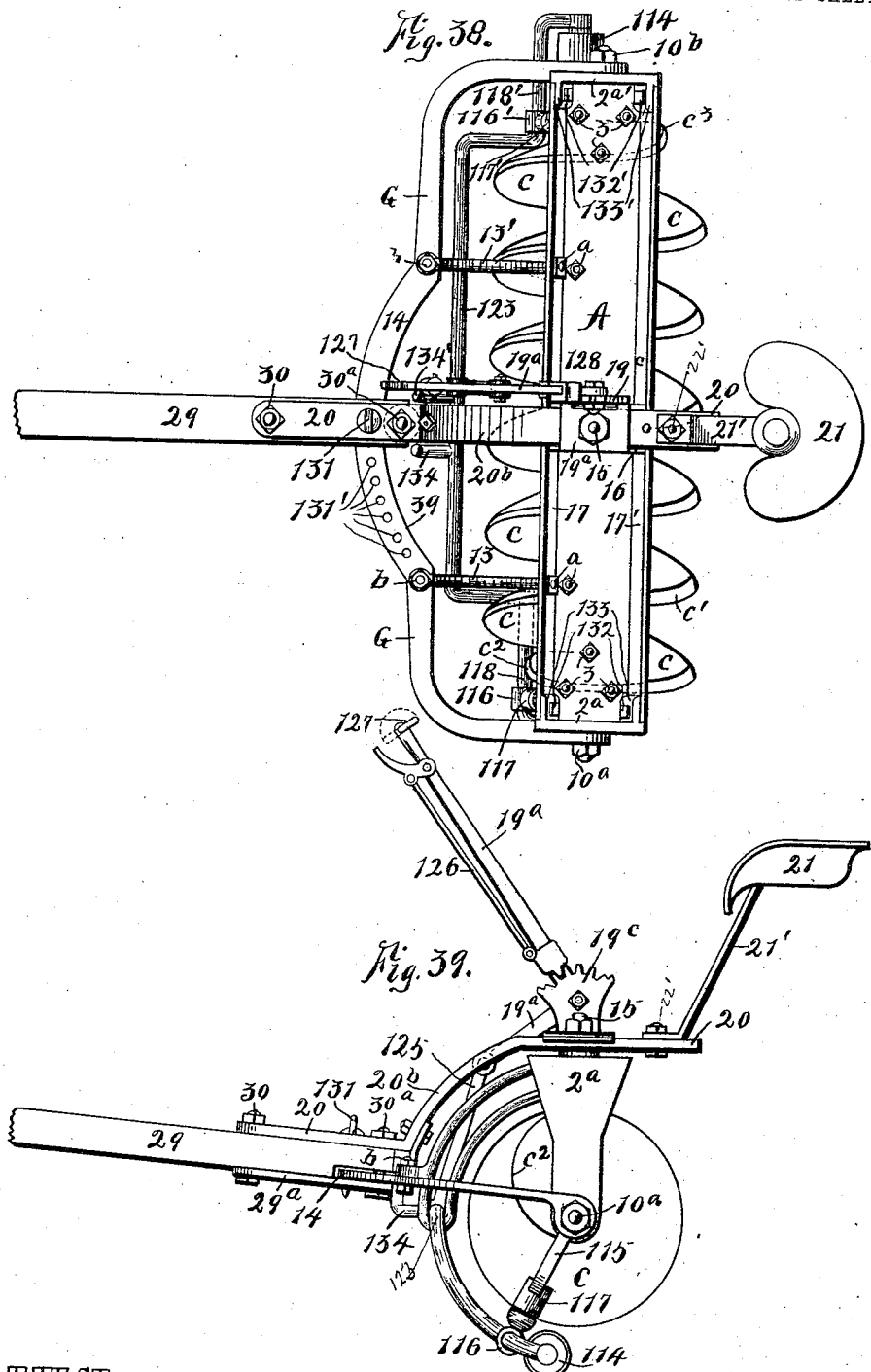

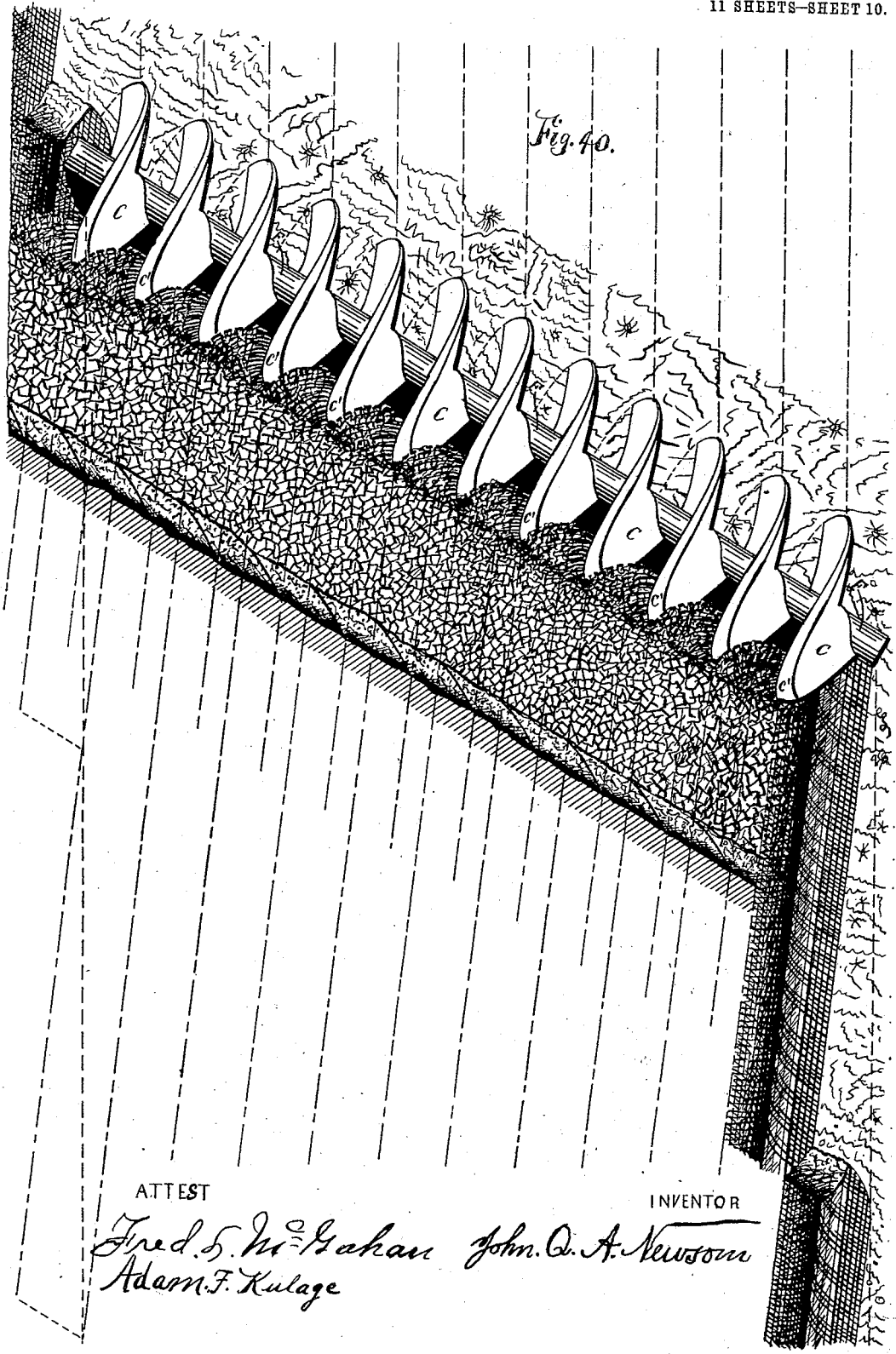

J. Q. A. NEWSOM.
LAND PLOWING, PULVERIZING, AND CULTIVATING MACHINE.
APPLICATION FILED APR. 25, 1904.
980,881.
Patented Jan. 3, 1911.
11 SHEETS—SHEET 11.
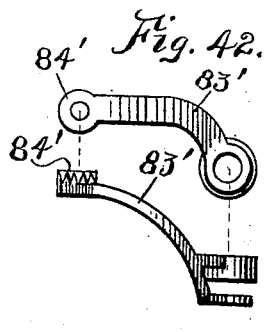
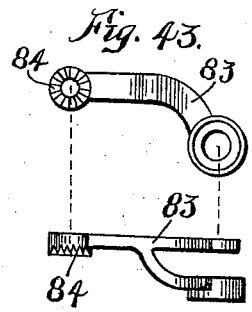
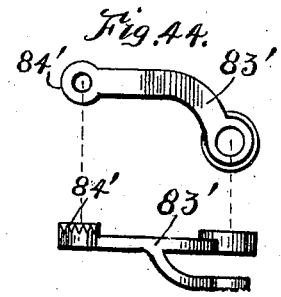
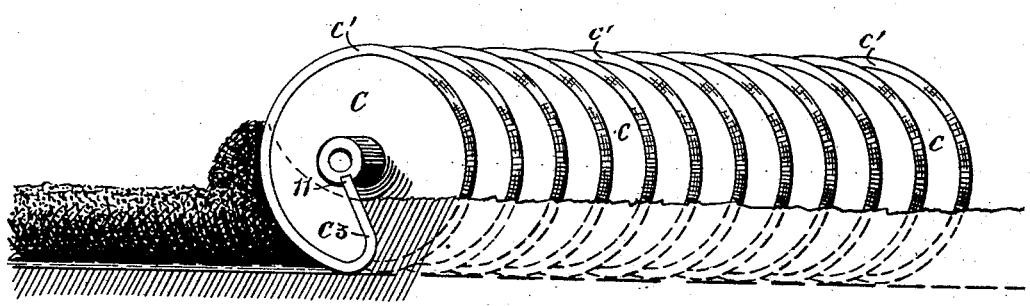
WITNESSES:
INVENTOR
John Q. A. Newsom
BY
ATTORNEY

UNITED STATES PATENT OFFICE.

JOHN QUINCY ADAMS NEWSOM, OF ST. LOUIS, MISSOURI, ASSIGNOR TO THE NEWSOM-ARCHIMEDEAN PLOWING MACHINE COMPANY, OF ST. LOUIS, MISSOURI.

LAND PLOWING, PULVERIZING, AND CULTIVATING MACHINE.

980,881.          Specification of Letters Patent.          Patented Jan. 3, 1911.

Application filed April 25, 1904. Serial No. 204,902.

*To all whom it may concern:*

Be it known that I, JOHN Q. A. NEWSOM, a citizen of the United States, residing at St. Louis, Missouri, pray that Letters Patent be granted to me for Improvements in Land Plowing, Pulverizing, and Cultivating Machines; and I do hereby declare that the following is a specification, taken in connection with the drawings furnished herewith, and forming true and complete description of my invention, such as will enable others skilled in the art to which it appertains to make and use the same.

My invention relates to certain new and useful improvements in revolving, land-plowing machines in which are employed spiral concavo-convex cutters arranged around a supporting shaft, and more particularly to that class of machines devised by me to be hereinafter noted, in which I embody in my present machine an improved form of slightly concavo-convex spiral cutters, which will be hereinafter more exactly designated and described as integral spirally-constricted mold-board shares and spiral or helicoidal cutter.

The attempts heretofore made to construct a revolving plow by employing a series of concavo-convex spiral cutting-blades have proved unsatisfactory and inoperative because of this fact: The blades or cutters were formed with too great a diameter, an improper pitch and an improper angle of axial inclination to the shaft, and also with too great a concavo-convexity to perform properly the penetrating share-cutting and the soil-turning functions of a plow.

The primary object of my present invention is, succinctly stated, to provide a land-plowing machine which will avoid the above defects, and of light draft and a proportionate increase in efficiency and rapid execution of its work:

The principal mechanical feature of the invention consists in the peculiar helically-constricted form of the mold-board shares, or the helicoidal cutter, which are the ground or soil working elements of the machine. The shares or the cutter may be secured on a shaft in any preferred manner, so they form a continuous-spiral cutter and are adapted to plow the ground on lines diagonal or oblique to the draft line and restrict themselves to said line. But I prefer the continuously formed helicoidal cutter rotatively journaled in an appropriate frame work for cutting and turning the soil at a uniform depth, corresponding to the width of strip cut by the entire series of said shares or cutters. They thus lay the soil furrow slices obliquely across the strip and to the draft line. The axis of said shares or cutters, so formed, will be mounted normally to the draft line and horizontally adjustable thereto at various oblique angles and will have its horizontal plane of axial rotation as close to the surface of the ground as possible, in order to enable the cutters to be self-compensating in their soil-and-earth-cutting screw action against side draft or lateral thrust. This thrust is a characteristic and objectionable feature of all former revolving plows having angularly or spirally mounted plow-shares, especially those plows of the rotary disk character. This self-compensating action had not been successfully attained in any former land-plowing machine using such angularly mounted shares, so far as I know, without using exterior compensating devices to counteract such thrust, until I discovered the form, pitch, and the required angle of axial inclination to a shaft to which the shares or the cutters should be spirally constricted that would plow the ground and accomplish this desirable result, by mounting a series of integral spirally formed or constricted mold-board shares or cutters in an appropriate frame work and tested the invention.

The invention is a rotary, land-plowing, pulverizing and cultivating machine of exceedingly light draft in proportion to the amount of work performed in a given length of time. It is also well adapted to the general purposes of land cultivation as distinguished from the mere soil and sod overturning process by executing a two-fold purpose or function: first, in breaking up the soil, and then, with the same implement, when required, cultivating the same. For example, where land has laid fallow and in the meantime heavy rains have caused the ground or soil to "run together," becoming "baked" and hardened, thereby requiring a secondary working or cultivation to reduce it to a fine tilth before seeding; or where a foul growth of noxious weeds infest such land, a cultivating machine of this character will be of important service to the farmer for rapidly loosening up the soil and exterminating said weeds.

Owing to the peculiar axially-inclined helicoidal form of the mold-board shares, my plowing machine is especially adapted to work in dry, hard wheat-stubble ground, where I have demonstrated the actual penetrating power of the helicoidal cutters, and where it was impossible to use the common plow. I have also shown a saving in the drawing of my machine of more than one-half of expended power required in drawing the common plow, and a proportionate increase in efficiency over the common methods of plowing prevalent in many sections of the West.

Additional advantages of the machine are compactness of construction and inexpensiveness of manufacture.

To these ends, and to carry into practical operation the primary principles outlined above, the invention further consists of a horizontally disposed plow-beam, or frame, mounted normally to the draft line. The beam has its appropriate framework and a revolving plow-shaft carried substantially parallel with said frame and obliquely adjustable to the draft line at any desired angle for all kinds of work. The shaft preferably has an axially inclined helical groove cut on, or otherwise formed around said shaft of any desired length for the plow and adapted to have such shares or cutters screwed thereon, forming a continuous spiral line series of integral mold-board shares, which will have the required pitch and angle of axial inclination to the shaft, to plow the ground and restrict the plowing machine to the draft line. They are also preferably removably secured to said shaft, the shaft being journaled on an axle substantially parallel with the beam or frame, and provided with a shifting means, including a hand wheel, for swinging said frame from the normal to oblique positions to the draft-line and adjusting the same thereto, so as to change the angle at which said shares enter the ground with reference to the draft line. The means for adjusting and locking the plow-frame in position are effected by the shifting means or mechanism operated by the driver while the shares or spiral cutters are working in the ground.

Another object of my invention is to provide a pair of separately mounted rudder-carrying wheels, adjustable on vertically disposed pivotal shafts, provided with mechanism whereby the operator of the plowing machine can simultaneously pivotally adjust horizontally both of said wheels on said shafts from their normal lines of travel parallel to the draft line to parallel lines with each other oblique to the right or left of said line. Still another purpose is to provide mechanism whereby said operator can vertically adjust either one of said wheels independently of the other, or both of the rudder-carrying wheels simultaneously with each other, and, with the aforesaid horizontal adjustment of both of said wheels respectively; and still further to provide said rudder-carrying wheels with means whereupon shifting the axial line of the spiral cutters, said wheels are automatically made to swing horizontally to parallel lines of travel corresponding to the draft line, and with means for vertically inclining the rudder-carrying wheels.

A still further object of my invention is to provide an integral, spirally-constricted mold-board share, or axially inclined spiral cutter for attaching to a revolving plow-shaft formed on constricted helical lines, slightly concavo-convex on its radial lines, substantially conforming to the natural stress of the metal in spirally constricting said share to the required pitch and angle of axial inclination to the shaft and its peripheral section beveled on its convex side to a sharp edge, adapted, when joined together in spiral line series, to restrict themselves to the draft line.

A still further object of my invention is to provide an integral spirally-constricted axially-inclined share for a plow-shaft having a V-shaped grooved sectional end, and a V-shaped beveled sectional end, respectively adapted to fit each other in series. And still further to provide an integral spirally-constricted share or cutter having one of its sectional ends cut away on a circle struck eccentrically from its circumference down to said shaft and the cut away section beveled on the convex side to a sharp edge. And further to provide a continuous axially-inclined helicoidal-cutter rotatively journaled in an appropriate frame work adapted in its soil-and-ground-cutting screw action to restrict the machine to the draft line.

The invention is also designed to provide an endless chain having friction wheels adapted to travel in flanged guideways in an appropriate carrier-frame, and a plurality of link-supported brackets, said brackets carrying a system of friction wheels and traveling auxiliary mold-board deflectors having sharp edges designed to pare off adhering soil and coöperate with the helicoidal cutters in overturning the soil-leveling, pulverizing and reducing the same to a fine tilth. The chain is automatically moved or operated by the screw action of said shares or cutters; it is also intended to provide mechanism for adjusting said carrier-frame and its system of friction wheels and deflectors radially to the axis of said shares, and vertically to and from the surface of the plowed-ground for leveling down and pulverizing the same.

A still further object of my invention is to provide a disk-plow designed to cut a straight furrow in the line of draft intersecting the oblique furrows made by the combined series of shares, and also a mold-board deflector adjustable on the concave face of said disk-plow, and a mechanism for vertically and radially adjusting said plow to the axis of the mold-board shares, and to -and from the ground.

Yet another object of the invention is to provide a weed-roller adapted to roll down weeds, stubble, etc., in front of the shares or the cutters in condition to be turned under the furrow slices; and further, to provide said weed-roller with an adjusting mechanism for varying the height vertically, for gaging the depth of penetration of said shares in the ground, and also for lifting them out of the ground and thence transporting said plowing machine on the roller. And, finally, to provide a plowing machine embodying a novel mechanism which will accomplish the foregoing described results, and which is simple, compact in its construction, readily handled and operated, easily understood, and economically manufactured.

My present invention appertains especially to the type of revolving plowing machines heretofore devised by me, some of the features of which have been disclosed in Letters Patent granted me No. 349,807, dated September 28, 1886, and others in Letters Patent, No. 396,170, dated January 15, 1889. I trust it will be pertinent, in this connection, to state that at the time I made application for said patents numbered and dated as above, I had not so completely demonstrated the actual correctness of my first or original conceptions, by making practical tests with my machine in differing soils and conditions of soils. I have now, however, demonstrated that my original conceptions were, in the main, correct, but the means or devices I then adapted, to carry those conceptions into practical operation, were, in some respects, crude and imperfect. I have also demonstrated that, to give average satisfactory service in all kinds and conditions of soils and for general work, the form herein disclosed is preferable; yet other forms of mold-board shares or cutters can be made, or otherwise changed or modified to work soils of a special character, without departing from my obvious intent or the spirit of the invention. The mean angle of axial inclination for said shares to the plow shaft is from forty-five (45) to sixty (60) degrees, and the range of oblique adjustment for said shaft from its normal position to the draft line is ordinarily about thirty (30) degrees to thirty-five (35) degrees, when organized and constructed according to my present invention. I will state, however, that I have obtained my best results with what I have hereinbefore designated as spirally-constricted mold-board shares, or helicoidal cutter, because, as I have designed and constructed them, the forward sharp cutting edges of said series of shares or the cutters, on entering the ground, cut into and under the soil furrow slices, performing substantially the share-cutting functions of the common plow, and then by rearward and upward revolution, the same share, in upturning and discharging the displaced soil therefrom, performs substantially the same functions as the fixed mold-board share of the common plow,—hence the name spirally-constricted mold-board shares.

My mold-board shares have about the same form spirally as the mold-board of the best common plows and act on the soil in a very similar manner, notwithstanding they are revolving mold-board shares, lifting and upturning the soil along oblique lines across the course of the machine by lever power, but comparatively free from friction of the common plow which exists at every point and side thereof. Nevertheless, such common plows are regarded as the standard of excellence in comparison with all plows of the rotary type. I believe it is also apparent in the evolution of the rotary plow that its efficiency and plowing merit have been developed in proportion as its working features have approached the characteristic form of the best common plows, and these particular features of the common plows I have mechanically assimilated into the revolving mold-board shares or cutters of my plowing machine. I desire to state further, while on this subject, in order that the objects and the primary principles involved in the construction and operation of my machine shall be thoroughly understood, and its operation, in every detail, made as clear as possible, that my mold-board shares or the helicoidal cutter are almost frictionless, as above stated, and that from this fact the sharp cutting share portion of said moldboards, in making their initial cut, enter the soil in an oblique vertically-inclined plane to the draft line and are forced to a share cutting screw action. Thus they cut laterally downward into and under the sliced soil by the combined forces of the draft and by the weight of the plowing machine acting on the sharp edges of the cutters. At the same instant, they are cutting, sliding and rolling on their beveled peripheral sections and convex margins obliquely forward into and through the ground in a right line direction of the power or line of draft, thereby maintaining sharp edges on said shares by the gradual wearing down of said beveled sections and margins thereof in such a manner as to seldom require further attention than an occasional sharpening with the file until they are worn out; they can then be renewed by new mold board shares or a helicoidal cutter. A similar, but less wearing, whetting and sharpening process takes place on the rear discharge of the soil on the concave margins of said shares. This revolving, sliding screw action on the beveled peripheral sections and convex margins of the series of shares constitutes the land side in my plow, performing by said screw action substantially the same function in resisting lateral thrust or side draft as by the land side of the common plow, and is what prevents lateral thrust or side draft in my plowing machines when they are constructed and operated according to my present invention. I will state further, that I have tried cutters of various degrees of concavo-convex cross section, and beveled on the edge of the convex face. Such may have a degree of merit in very loose, sandy soils, but I prefer cutters of the proximate form of those described in this application, for general use.

If the revolving plow shaft or the mold-board shares thereof are adjusted to work in the ground on oblique angles to the draft line, at from twenty five (25) to thirty (30) degrees, or thereabout, and should manifest a tendency to side draft, or the tongue of the said machine should swing to the right or left, as the shares or said cutters may be so axially inclined to turn the soil, by reason of such hard ground or other cause whatever,—in such cases I prefer "hitching" one or more of the draft animals in the lead or end of the tongue. I thereby increase the leverage over the increased resistance of said ground acting on the concave soil-displacing faces of said shares. This resistance is overcome through the tongue as a tension leverage acting on the beveled peripheral sections and convex margins of each of said series of shares or cutters as the fulcrum points thereof. The draft animals hold said machine in substantial working alinement with the draft line. I make provision in said large machines, for example, from four or five feet up, for disengaging the rudder-carrying wheels from the plow frame by removing a couple of bolts and thereafter using the weed-roller of said large machines for gaging the penetration of said shares in the ground; and also for lifting said shares out of the ground, and thence transporting the machine from place to place on said weed-roller.

The height or diameter of the spirally-constricted mold-board shares and the pitch to be given them depend largely on the kind of work, character of soil and local conditions prevailing, where the plows are to be used. If, however, the shares be 18, 20 and 24 inches in height and for a proportionate depth of penetration or cut, and a pitch of about 7, 8 and 10 inches, respectively, they will meet most of the miscellaneous demands incident to said conditions. I desire to state further that my present invention is susceptible of a great many changes and modifications; similar parts may be substituted for those shown and described without in the least departing from the obvious intent or spirit of the invention.

Referring to the drawings in which like letters and numerals have like reference to like parts throughout the various views: Figure 1, is a top plan view illustrating one of my large six to eight foot plowing machines shown in one of its working positions, when adjusted at an angle of about thirty (30) degrees to the draft-line and having a portion of the tongue and truss-rods broken away. Figs. 2 and 3, illustrate details in connection with the trailing rotary-disk plow. Fig. 4, illustrates the plowing machine in rear elevation having its rudder-carrying wheels vertically inclined for plowing tillable, rolling land. Fig. 5, is an enlarged transverse section of the endless chain and its carrier-frame taken in the line $x—x$ Fig. 9, showing the attachment of the bail to said frame, and the traveling deflectors. Fig. 6, is an enlarged transverse sectional view taken in the line $x'$ $x'$ Fig. 10, showing attachments of the end brackets of the carrier-frame. Figs. 7 and 8, are convex and concave views, respectively, of the traveling deflectors. Fig. 9, is a top plan view partly in section of the endless-chain carrier-frame, and its adjustable end-brackets. Fig. 10, is an edge or side view of the endless-chain carrier-frame and a sectional view of its end brackets taken in the line $y$ $y$ Fig. 9. Fig. 11, is a longitudinal sectional elevation of the plow-frame taken in the vertical plane of the axis of the shares or cutters, Fig. 16, showing the left hand rudder-carrying wheel in section in the same plane, and both of said wheels shown as axially pivoted to their respective rudder-lever brackets. Fig. 12, illustrates a revolving plow-shaft and its axially inclined helical groove. Fig. 13, is a longitudinal section of a plow-shaft having no cavity for lubricants. Fig. 14, illustrates the weed-roller having its ends shown partly in axial vertical section, disclosing its axial end pivots and cavity for lubricants. Fig. 15, illustrates a continuous axially inclined helicoidal cutter, for rotatively journaling in an appropriate frame work. Fig. 16, is a horizontal section and a detailed top plan view, taken in the horizontal plane of the axis of said shares or cutters Fig. 11, illustrating the pivotal attachment of the hangers for the weed-roller, endless-chain carrier-frame showing the system of friction wheels and the traveling deflectors, and the rotary inclined disk-plow, respectively, to the plow-frame, a part of the endless chain being disclosed by section. Fig. 17, illustrates a side or edge elevation of the endless chain carrier-frame. Fig. 18, illustrates an enlarged detail plan, partly in section, of an end portion of the carrier-frame, its flanges, endless chain, friction wheels and brackets. Fig. 19, illustrates a perspective view of the endless chain, its upper and lower series of friction-wheels, and brackets, having leaf springs. Fig. 20, illustrates a right hand or land-side end elevation of the machine embodying my invention having its carrying wheel removed, leaving its pivotal bolt seen in the rudder-lever bracket, thus disclosing more clearly the construction and arrangement of the parts. Fig. 21, is a vertical transverse section of the plow-frame, and a detail taken in longitudinal vertical section through the center of the tongue and pivotal bracket of the plow-beam and frame, having the end brackets and rotary disk-plow removed therefrom as seen in Fig. 20, for disclosing all the parts distinctly to view. Fig. 22, is a detail showing the system of friction wheels and traveling deflectors, thrown out of engagement with the cutters, or shares, by their axial and vertical adjusting mechanism. Fig. 23, illustrates the left end elevation of the machine having its rudder-carrying wheel removed, leaving its pivotal bolt seen in the rudder-lever bracket, disclosing all the parts to view at this end of the machine. Figs. 24 and 25, illustrate, respectively, an end and a side elevation of a screw-threaded, vertically disposed pivotal shaft of the hand wheel adjusting mechanism for the rudder-carrying wheels. Figs. 26 and 27, are a top plan and a side elevation, respectively, of the screw-threaded rudder-lever bracket for the screw-threaded shaft. Figs. 28 and 29, are a top plan and side elevation, respectively, of the slidably-adjustable rudder-lever bracket for the vertically-disposed pivotal-shafts. Fig. 30, illustrates a screw-tapped staple for said slidable brackets. Figs. 31 and 32, respectively, illustrate an integral mold-board share having its sectional-radial ends provided with a V shaped grooved end and a V shaped beveled end. Figs. 33 and 34, are a concave and a convex side elevation, respectively, of an integral, spirally-constricted mold-board share, formed of an annular metal disk, and illustrate the spirally constricted overlap of the opposite transverse radially-slitted ends of said share. Fig. 35, illustrates one of my six to seven foot plowing machines, fully organized as seen in a top plan view of the same. Figs. 36 and 37, are a plan and a left-end elevation, respectively, illustrating a four to five foot plowing machine as organized without rudder-carrying wheels and trailing disk-plow, but provided with a shifting means and means for substituting the weed-roller for the rudder-carrying wheels in gaging the penetration of the shares and for transportation. Figs. 38 and 39, illustrate one of my two to three foot machines, organized in one of its simple forms of construction. Fig. 40 is a diagrammatic view illustrating one position of an eight foot plow, plowing about seven feet, and its draft line, and the furrows turned thereby. Fig. 41 is a front perspective of the plow, when plowing about seven inches deep.

I will first describe the large eight foot plowing-machine, Figs. 1 to 23, inclusive, which is well adapted for six or eight draft animals. In the drawings illustrating this machine, A indicates a plow-beam having longitudinal flanges. This beam may be made of wood or metal, with or without flanges, and at any desired length for the plow. I prefer flanges to the beam for the convenience they afford in forming a trough-like receptacle for ballast, and convenient points for attaching operating devices for properly handling the machine. I also prefer to construct the plow-beam as stated and organize all its adjuncts in harmony with the peculiar soil or ground-working elements of the plowing-machine so that the whole frame-work shall be superimposed on the axle supporting said mold-board shares and the axes of the rudder-carrying wheels, said wheels jointly coöperating with said shares or the cutters in the transportation of the machine while they are working in the ground. Having this end in view, the plow-beam A is provided with upper brackets 1, 1', and lower brackets 2, 2', mounted on each end of said beam and secured thereto by the retaining bolts 3, 3', through the beam and flanges of said upper and lower brackets, respectively. The vertically disposed pivotal-shafts 4, 4' are mounted parallel in the vertical plane of the plow-shaft F, and are provided with right and left screw-threaded upper and lower ends 5, 5', and 6, 6', respectively, and screwed into the lugs 7, 7', on the outward faces of said brackets coöperating with the bolts in binding said brackets firmly on the ends of said beam. The axle 8 is mounted in said lower brackets substantially parallel with said beam by a reduced threaded portion 9, 9', extending through said brackets, and collars 9ª 9ᵇ, said collars resting against the outward faces of said brackets 2, 2', all of the parts being held together firmly by threaded nuts 10, 10', on the outward ends of said axle, thus completing the frame-work. The object of this construction is to permit an easy assembling of the parts and also a free pivotal movement of the intervening hangers and push-bars concentrically pivoted thereon. The purpose of which, and the devices, and their adjusting mechanism, will be explained in their proper order.

The beam A, and its lower brackets 2, 2', are important elements in the framework of the plowing-machine, together with the axle 8 upon which the plow-shaft F is journaled, having a cavity 8' for lubricants in the shaft and around said journal, accessible by means of a screw-threaded plug 11'. I preferably provide also an axially-inclined helically-formed groove 11, cut on or otherwise formed around the shaft see Figs. 11, 12, 13 and 41, upon which is screwed a continuous axially-inclined helicoidal cutter C as shown in Fig. 15. Or, as hereinbefore stated, the axially inclined integral spiral-cutting mold board shafts may have their transverse sections provided with a V shaped grooved end and a V shaped beveled end, V, V', Figs. 31 and 32 respectively, adapted to fit into each other in series. Or, in some machines, they may be safely left as radially-slitted Figs. 33 and 34 and their slitted ends abutting each other as the pressure of the share against the soil is greater on the convex than on the concave side of the series of shares, which is the land side of the plow and receives the lateral thrust due to the cutting screw action of the shares. This fact tends to bind said ends together when normally working in the soil, as before described, said shares or the cutters having their peripheral sections C' beveled to a sharp edge, upon which the whole weight of the plowing-machine, with all its adjuncts, may be transferred and carried. It is also one of the features of this construction relied on to hold the shares down to their work. There is thus formed, by said beveled peripheral section, a tread-like, rolling, sliding surface, as it were, which tends to promote the wearing-life of the shares. Said figures are also designed to illustrate the spirally constricted overlap $C^4$ of an axially inclined integral spiral cutting mold-board share, formed of an annular radially slitted metal disk, for screwing on, or otherwise, attaching to an appropriate revolving shaft, for forming a continuous spiral line series, and each having its entire body portion formed on spirally constricted lines substantially conforming to the natural stress of the metal as described, slightly concavo-convex in form on their radial lines. The above language is intended to describe what actually takes place in the dies made for properly forming said shares. There is a natural strain and stress in the metal intervening radially between the inner helix formed of the hole in the disk and the helix formed of or described by the beveled cutting edge or periphery of the disk. I will state further, however, in his connection, that the term conforming to the natural stress, and the term spirally constricted, as herein used, have reference to this fact, and means that the metal disk naturally assumes the concavo-convex form radially without any assistance from the dies and also that it naturally assumes the spirally constricted form without their assistance; further, than to press forward the radially slitted sectional ends to complete the spiral constriction of the disk to the proper angle of axial inclination and the requisite pitch for the purposes herein set forth. It is not to be inferred from the foregoing statement, that other forms of spiral cutters can not be made to perform the functions of a plow, as herein described, for they can, but this special form is preferred for general purpose work. For general use and long service, I deem this beveled form of share or cutter preferable at this point, to thin, tapering shares, which, owing to the friction, would wear away faster. I prefer cutting away or rounding each end of said continuous spiral-cutter on a circle eccentrically struck from the periphery of said end cutter down to the shaft and the cut away section beveled on the convex side to a sharp edge $C^2$ $C^3$—thus enabling the shares or cutters to gradually penetrate the ground. The front section of the frame-work is firmly bound together by the draft-bail G horizontally disposed substantially parallel with the axis of said plow shaft and slightly inclined above the horizontal plane of said axis in a plane substantially parallel with the draft-line of the machine. The ends of the bail should be curved or bent to give room both for the revolving helicoidal cutter C and for the weed-roller hereinafter described. Said draft-bail is secured to the flanges on the lower brackets 2, 2' by retaining bolts 12, 12' and to the plow beam A by means of a pair of separately disposed guide-braces 13, 13'. The braces have guide segments struck from the axis of the shares and secured to the plow-beam A and to the draft-bail G by retaining bolts $a$, $b$, respectively. In some machines the draft-bail will be secured to the outward ends of the axle 8 by screw-threaded nuts $10^a$ $10^b$. See Figs. 38 and 39. 14 designates a segment in said bail G, struck from the pivotal-center bolt 15 in pivotal-bracket 16 which is bolted to the flanges 17, 17', respectively, on said plow-beam and has a vertical tubular-pivot 18 through which the screw-tapped center bolt 15 is inserted for binding the toothed segmental plate 19 thereon, to which hand-lever 19' is pivoted for adjusting the weed-roller to be hereinafter described.

The draft-bar 20 is horizontally pivoted on the vertical tubular pivot 18, upon which the plow frame or beam with all its adjuncts is susceptible of horizontal adjustment; the driver seat 21 is adjustably supported by means of a strong leaf-spring 21' made adjustable on the rear end portion of said draft-bar, by means of a series of holes 22, and bolt 22'. The adjustment of said seat is effected for properly balancing the plowing-machine, thereby preventing undue weight on the necks of the team.

I will now describe the devices or the mechanism I have adopted in this instance to effect the changes indicated above. Other devices than these here shown and described can be used without departing from my obvious intent in making this invention. I preferably provide a foot tiller-lever, 23, pivoted concentrically with the draft-bar on said tubular-pivot, 18, which lever affords a convenient foot-rest for the driver or operator of the machine; and I pivotally mount on said foot-tiller lever, 23, a spring-retained foot-latch or pawl, 24, which penetrates said lever at 26 for engaging a series of holes 27 in the draft-bar 20, locking said lever 23 with the draft-bar. The spring-retained foot-latch 24 has, in this instance, a helical-spring 28 coiled around the screw-threaded nut of the pivotal-center bolt 15 for holding said latch in engagement with holes, 27, thereby enabling the driver of the machine, by pressure of either one of his feet, to release the latch from its engagement with said holes in the draft-bar. Thus both his hands will be free to manage the reins of his team, while the foot may shift and lock said lever in any one of the holes desired. The purpose of this will appear further on.

The draft-bar, in some machines, will have a downwardly bent angular portion 20$^a$, and in others, a curved portion 20$^b$, secured to the tongue 29 by bolts 30, 30' and 30$^a$, respectively, best seen in Figs. 20 and 21, and Figs. 35 to 38. In machines of from four or five feet up, in length, I prefer strengthening the tongue 29 by a pair of truss-rods 32, 32'. This is to obviate lateral strain and consequent breakage when turning the machine at corners of areas of land, as at such times the shares, or the helicoidal cutter may be permitted to continue working in the ground while making such turns. In the large sized machines the lateral strain is greater, of course, than in smaller ones. I deem it proper to state that, in thus turning the machine, the shares or the cutters have a greater pulverizing screw-action on the soil by reason of the sweeping, grinding action thereon. The leverage or fulcrum point in making said turns will be on the peripheral margins of the front convex portions of the series of cutters. No extra labor is imposed on the operator or the team in making such turns. I will further state, in this connection, that when machines are constructed according to my invention, with their shares or the cutters axially-inclined to the left, I prefer turning the machine to the right hand, and, to the left hand, when said cutters are axially-inclined to the right, thus effecting a more complete pulverization of the soil. The truss-rods 32, 32' are secured to said tongue by bolts 32$^a$ as shown, and are supported by the king-posts 33, 33', resting against the draft-bar 20, tongue 29, and guide bracket 29', respectively. From the king-post to the rear of the tongue said rods converge and are secured in the guide-bracket by the screw-threaded nuts 34, 34', best seen in Fig. 16, said tongue abutting against the bracket at this point for that purpose. These rods take the place of braces, and are deemed preferable for this construction, as the normal positions of the plow beam and all its adjuncts are changeable to variable-oblique positions to the tongue or the draft-line. Said rods are also of great importance in large machines, for the reason that when cutters are working in dry, hard ground, under such conditions, if four or six draft animals are "hitched abreast" to the machine, I prefer a neck-yoke having breast straps for each of said animals, which will enable them to participate in swinging the machine around. Or by "hitching" one or more of such animals to the end of the tongue, we may dispense with said neck-yoke for a less number of animals abreast. This will, in either case, give sufficient leverage for swinging said large machines at the corners of areas of land being plowed. Hence the necessity for the truss-rods.

I prefer the following described shifting or rotating hand-wheel mechanism for the proper manipulation of the large machine, best seen in Fig. 20 and Fig. 21. This consists, as shown, of a hand-wheel 35 and its shaft 36, which is journaled in the draft-bar 20, tongue 29 and guide-bracket 29', respectively. The shaft 36 has a friction wheel 37 and a toothed or spur-wheel 38, keyed in juxtaposition on said shaft interposed between the tongue 29 and guide-bracket 29'. This friction wheel 37, and the toothed wheel 38, are respectively adapted to engage the inner concave segmental-face 39 of the draft-bail G and the toothed segment 40, which is secured to the draft-bar segment 14 by retaining-bolts 41, 41' in the ends thereof. The locking device for the hand-wheel 35 consists of a toothed-pawl wheel 42, secured on the hand-wheel shaft 36 at or near the point where said shaft enters or is journaled in the draft-bar 20, and adjacent to said toothed pawl-wheel 42. A bracket 43 is also secured to said bar 20 in machines having the angular and the curved portions, respectively, 20$^a$ and 20$^b$ of said bar, by bolt 44. Pivoted on said bracket is a spring-retained foot-latch or pawl 45, which is within convenient reach of the feet of the driver or the operator who will occupy seat 21. By the pressure of this spring, he can release the latch 45 from its engagement with the pawl-wheel 42, while with his hands he can rotate the hand-wheel 35 whereby he can shift or swing the entire plow-frame with all its adjuncts from their normal position to the draft-line to oblique positions to said line. By this means he may change the normal axial-line of said shares or cutters to various oblique positions to said line, and, consequently, the angle at which the cutters enter the ground for all kinds of work. I will hereinafter have occasion to refer to the operation of the hand-wheel mechanism and its connection with other devices or members of the invention in their regular order.

I will now revert to the description of the foot-tiller lever 23 and its operation and connection with the hand-wheel mechanism just described. Said foot-tiller lever has an eye 46 in which are pivotally secured tiller-rods 47, 47'. These rods extend from said eye 46 in opposite directions therefrom a little above and in front of, and substantially parallel with the plow-beam A, and are pivotally secured in eyes 48, 48' of the rudder-lever brackets 49, 49'. The brackets are horizontally pivotally adjustable on the vertically disposed pivotal-shaft 4, 4', which have been hereinafter fully described in connection with the plow frame. These rudder-lever brackets, 49, 49' are provided with vertical flanges 50, 50'. See Figs. 11, 26 and 28. To the lower extremity of these flanges are pivoted or hinged (by means of bolts 51, 51') stub-axles 52, 52', upon which axles the rudder-carrying wheels B, B' are axially mounted. Said stub-axles and wheels are detachable from the rudder-lever brackets by removing said bolts 51, 51' on occasions when the services of said wheels are not needed. The stub-axles and wheel-hubs are provided with sand-caps or housing of ordinary construction to exclude dust and dirt therefrom. The stub-axles are provided with collars 53, 53' that abut said flanges when the axles are adjusted in their normal or horizontal position substantially parallel with the vertical plane of the axis of the plow-shaft, which is the normal working position of said wheels. But, as hereinbefore stated, the machine is more or less affected by gravitation, as the declivity of the land may vary. Accordingly, I provide, as one of the means for this purpose, short adjustable braces 54, 54' pivoted upon the axle-collars to lugs 55, 55'. Said braces are made adjustable at their free ends in a series of vertically arranged holes 56, 56' in the flanges 50, 50' for varying either one or both of the rudder-carrying wheels to any suitable degree from their normal vertical planes to opposing vertically-inclined planes of rotation. As, for example, when said braces are secured by their adjusting-bolts 57, 57' in the uppermost holes of said series, the rudder-carrying wheels will be rigidly held or locked in their normal vertical planes of rotation, thereby adapting the plowing-machine for general purpose work over land of average undulation, and when said braces and adjusting-bolts are secured in the lowermost holes of said series, it will then be in its best condition for resisting gravitation by means of this device.

It will be understood that the term "restricting the plow to the draft-line" is used here in a general sense, as implying normal or average conditions of ground or soils. For example, if the shares be lifted out of the ground, or nearly so, by an obstruction, it will then tend to veer in the opposite direction from the axial inclination of the mold-board shares or the helicoidal cutter, and also, when the plow is working at abnormal depths, in very loose ground, the decreased resistance occasioned thereby, on the concave or soil-turning side of the shares, will cause the plow to veer in the direction of the axial inclination of said shares or the cutters. On all such occasions it will be understood the rudder-carrying wheels are available to counteract such conditions and tendencies. For vertically adjusting the height at which the plow-beam or frame with all its adjuncts may be carried, and for regulating the depth of penetration of said spiral shares in the ground, I illustrate and describe two methods or devices preferably adapted in the present instance to the manipulation of the smaller and the larger classes or sizes of plowing-machines respectively.

I shall first describe a pair of separately mounted hand-levers 58, 58', adapted, for example, to machines from five feet up to eight feet in length or thereabout. The large machines require stronger devices, described hereinafter. Said hand-levers 58, 58' are within convenient reach of the driver's seat 21, and are pivotally fulcrumed to the rock-shafts 59, 59' mounted in the segmentally-toothed brackets 60, 60', which are secured to the flanges of the plow-beam or frame A by bolts 61, 61'. Each of said levers has a thumb-latch-and-pawl-locking-connection with said toothed segments in a manner well known and in common use. Said rock-shafts are pivotally mounted in each of said toothed segmental brackets and also in the end brackets 1, 1' of the plow-frame A, substantially parallel with the axis of said plow-shaft. On the outward end-portion of each of said rock-shafts are secured a pair of toggle-levers 62, 62', which are pivotally connected to the rudder-lever brackets 49, 49' by means of screw threaded-and-tapped staples 63, 63', which are secured in lugs 64, 64' on said brackets, said staples penetrating the eyes 65, 65'. In said toggle-levers, said eyes permit a free, limited rotary movement of said staples therein, without binding or cramping their action.

As stated hereinbefore, large machines would require more powerful means for their vertical adjustment. I will now describe the modification referred to: Figs. 24 and 25 illustrate a portion of the frame in detail of the left end of said machine having the modifications attached thereto. The other end, not shown, is a duplicate of the same. In this machine 58$^a$ designates the hand-wheel for said left hand end, mounted on shaft 58$^b$ here shown as being hand-rotated in a vertical plane. Yet said wheel may be horizontally mounted and rotatable from the driver's seat 21 in a horizontal plane by using a pair of mitered or beveled gearings similar to those on the other end of hand-wheel shaft 58$^b$, now about to be described. Said hand-wheel shaft here shown is pivoted or journaled in bracket 59$^a$, which is secured to said flanges 17, 17' of the plow-beam A by bolts 60$^b$, 60$^c$. This shaft lies horizontally in a vertical plane substantially parallel with the axis of the shares or the helicoidal cutter. The upper end-bracket 61$^a$, and the lower dependent bracket 62$^a$ are secured to the plow-beam A by means of retaining bolts 63$^a$ through the beam and flanges of the upper and lower dependent brackets, respectively. The vertically disposed, screw-threaded, pivotal-shaft 64$^a$ is journaled in appropriate outward projections 65$^a$, 65$^b$ on the outward end faces of said upper and lower dependent brackets, respectively, said shaft being substantially in the same vertical plane as the axis of said shares or the cutters. A pair of mitered gearing-wheels 66$^a$ and 66$^b$ are secured in the upper end of said screw-threaded shaft 64$^a$, and on the outward end of said hand-wheel shaft 58$^b$, respectively, for rotating said shaft 64$^a$ in the screw-threaded, pivotal, rudder-lever bracket 67$^a$. To the lower extremity of this bracket, the rudder-carrier-wheel B is pivoted or hinged on bolt 51 of the stub-axle collar 53, as before described. It will be readily understood that by rotating the hand-wheel, 58$^a$, the screw-threaded, pivotal-shaft, 64$^a$, will be made to rotate in the screw-threaded rudder-lever bracket 67$^a$, thereby raising or lowering the horizontal plane of the tread of said rudder-carrying wheels. Thus we may control the height at which the plow-frame and its adjuncts may be carried to any suitable degree. The remaining parts of this modification are the same as that I have already described in connection with the hand-levers and toggle-mechanism for adjusting said wheels.

From the foregoing description, it will be readily understood that when the driver or operator of the machine occupies seat 21, he can, with either of his feet, release the spring-retained foot-latch or pawl, 45, from its engagement with the pawl-wheel, 42, on the hand-wheel shaft, 36, of said mechanism hereinbefore described. By these means said operator can, with both his hands, grasp and rotate said hand-wheel, thereby adjusting the plow-beam or frame and the axial-line of said spiral cutters from their normal position to the draft-line to various oblique positions to said line. Simultaneously therewith, by means of said draft-bar and tiller-rods, 47, 47', and their automatic connecting mechanism with said rudder-carrying wheels, he may shift or swing horizontally both of said wheels to various parallel lines of travel corresponding to the draft-line. And further, the operator may have both his feet resting on said foot tiller-lever 23, and with either foot release the latch 24 from its normal engagement with said holes 27 in the draft-bar, then, by means of said lever and the tiller-rods connecting said lever with the rudder-lever brackets 49, 49', said operator can, independently of said bar, pivotally adjust horizontally both of said wheels B, B' simultaneously on said pivotal-shafts from their normal lines of travel parallel to the draft-line to parallel lines of travel with each other, oblique to the right or the left of said draft-line. Furthermore, by the hand-levers 58, 58', and their connecting means with the rudder-carrying wheels, said operator can grasp with his hands either one or both of said levers, and by their connecting means, slidably adjust vertically, on said pivotal-shafts to horizontal planes of tread or travel, either one of said wheels independently of the other, or the tread of both of said wheel simultaneously with each other and with the aforesaid horizontal pivotal-adjustment by said foot-tiller-lever of both of said wheels, respectively. When adjusting the machine for transportation, both of the bell-crank hand-levers, 58, 58', will be brought down to, substantially, a horizontal position, throwing the pivots of their respective toggle-levers, 62, 62', practically in a vertical line, each in the same vertical plane.

I desire to call special attention to the peculiar and novel endless-chain system of traveling, horizontally-disposed mold-board deflectors for keeping the concave, helical faces of the shares or cutters clean and free from adhering soil and for other purposes soon to be described. I invite notice also to the friction-wheels provided and arranged for holding the sharp edges of said deflectors flush against the concave faces of the mold-board shares, and for moving or operating said system by the screw-action of said shares. The mechanical necessity for forming the helicoidal cutters in such close proximity to each other makes it necessary when plowing or working damp and adhesive soils to introduce an auxiliary means between the series of shares, or the cutters, to coöperate with them in turning or reversing such slices, cut by the shares or said cutters. This introduction is also further necessary in plowing or working dry soils as said slices are thrown up against the traveling deflectors by the revolving screw-action of the spiral cutting shares, or the cutters. Simultaneously filling the furrows made by the preceding shares or cutters in the series with pulverized soil—hence the importance of the endless-chain system of traveling deflectors designed to perform substantially the following duties or functions in the order named: First, to pare off adhering soil from the concave faces of said series of shares or cutters, preventing said soil from being carried over in front thereof; second, to intercept and prevent tussocks of grass and other roots from packing in between the shares and clogging or choking them up, or straw weeds, etc. from wrapping around the plow-shaft; third, to coöperate with the shares in reversing the furrow-slices delivered thereto by said shares; fourth, in pulverizing lumps of soil cast up against said deflectors by the screw-action of the shares; and, finally, by the grinding, horizontally leveling action of the returning portion of the system of said deflectors on the freshly turned soil, reducing the same to a fine tilth equal to that of ground which has been both plowed and harrowed or dragged by the common methods.

70, 70' designates an endless-chain carrier-frame, best seen in Figs. 16, 18 and 19, provided with an endless-chain supporting a plurality of wheels, 71, 71', journaled at 71$^a$ concentrically with the pivoted links, 72, composing the endless chain. Said wheels are adapted to roll on flanges in guideways, 73, 73', which are provided with guide-flanges, 74, 74', (see Figs. 9, 17 and 18) upon which said wheels travel while holding the chain to a right line movement. The guideways are connected at each end by a pair of upper and lower, separately mounted, end-adjustable brackets 75, 75', respectively, having segmental flanges 76, 76', connecting the guideways for the movement of said chain. Said brackets have a bolt-and-slot adjustment 77, 77' on said guideways for adjusting the slack in said chain, so forming a continuous, flanged guideway constituting the carrier-frame for the support of said chain and its adjuncts, consisting of a plurality of link-supported brackets, 78, integral with the links composing said chain. Each bracket has an arm or flanged portion 79, substantially parallel with said frame, and a bolt-and-slot-connection 80 in each arm for adjusting the friction-wheels 81 against the convex faces of the shares or cutters and for holding the sharp edges of the traveling deflectors 81' flush against the adjacent concave faces of the shares. Said shares simultaneously therewith move the entire system of traveling deflectors by the screw action of the spiral cutting mold-board shares or helicoidal cutters. The brackets have a second arm or flanged portion, 79', substantially parallel with the axial inclination of said shares or the cutters also provided with a bolt-and-slot-connection 80' for adjusting the traveling deflectors to and from said axis, and to radial angles on the concave helical faces of the mold-board shares.

In Fig. 19 I illustrate a modification of the bracket-arm 79' substituting for said arm or flange a leaf-spring 81$^a$ which may be secured to arm 79 by rivets or bolts, as at 82, and having a bolt-and-slot-connection 82$^a$. Said leaf-spring is designed to hold said deflectors yieldingly against the concave faces of said shares. The deflectors 81', herein illustrated, are slightly concavo-convex in form extending laterally rearward beyond the rear edges of said shares. It is to be distinctly understood, as hereinbefore stated, in or with reference to other elements in this invention, that these traveling mold-board deflectors 81' can be widely varied in width and in form. They may be bent or curved laterally in the direction of the overturning soil to any suitable degree—as, for example, when designed for especially turning sod, they may also be provided with downwardly curved extensions to enable them to engage with a greater surface of the furrow slices.

The endless-chain carrier-frame, 70, 70', is supported pivotally normally in a generally horizontal plane a little above the horizontal plane of the axis of the shares by means of separately pivoted hangers, 83, 83', Figs. 42, 43 and 44. These hangers are generally bifurcated as shown and downwardly curved from said plane and pivoted on each end-portion of the axle of said plow-shaft concentric with the axis of the helicoidal cutters. Said hangers have their free ends provided with annular, radially-toothed jaws, 84, 84', adapted to engage with like jaws on the upper adjustable end-brackets 75, 75, of said carrier-frame by means of pivotal bolts 85, 85'. By loosening said bolts, the entire endless-chain system of friction-wheels and traveling deflectors can be adjusted to various horizontally inclined planes to any desired degree for various purposes, one of which is to pulverize and level the freshly plowed soil, and another, to disengage and suspend the entire system of friction-wheels and traveling deflectors out of engagement with the helicoidal cutters on occasions when their services are no longer needed.

Most of the occasions met with for temporarily suspending the traveling system of friction wheels and deflectors out of operative engagement with the shares, or the cutters, for the time, preventing unnecessary wear of the parts, are in the sub-arid wheat growing sections of the country, where the normal state of the land is comparatively a dry one during the plowing season or period. In plowing such sections it is often preferred by the wheat grower to leave the surface of the plowed ground roughened by a clod formed soil condition as much as possible; and in connection with said condition, it is also preferred to have the stubble weeds etc., mingled with, and protruding from the surface soil, thereby jointly affording a means of retaining the snow for the conservation of moisture, and also, to prevent the soil from blowing away from the roots of the growing wheat plants. Substantially the same roughened soil conditions may be produced by machines in which said system is dispensed with, thereby enabling the clod-formed portions of the soil to escape pulverization. This is done by adjusting and locking the weed roller at a point that will best allow weeds and stubble to mingle with the soil, and escape being covered over by the cutters, or the spiral shares.

The carrier-frame, together with all its adjuncts, is vertically adjustable radially to the axis of the spiral cutters and to and from the surface of the plowed ground. This adjustment is made by means of a bell-crank hand-lever 86 (see Figs. 4 and 23) pivoted or fulcrumed in a bracket having a toothed segmental plate 87 which is secured to the rear flange 17' of the plow-beam by bolts, 88. The lever has an arm, 89, to which a vertically disposed bail 90, 90' is pivoted at 90ª having its opposite ends pivoted to separately interposed, flanged brackets 91, 91', interposed between, and riveted to the guideways 70, 70', of the carrier-frame. Said lever also has a thumb-latch-and-locking-connection with the toothed segmental-plate, 87; of ordinary construction, whereby the driver or operator of the machine can, from his seat, 21, grasp said lever and radially adjust the deflectors on the concave-faces of said shares or cutters. Simultaneously therewith he can also adjust the degree of horizontal, sweeping, pulverizing and leveling action of the returning traveling deflectors on the soil.

It will be observed that each returning deflector composing the series passes over and levels a space of plowed ground about equal to the width and length of the strip of furrow-slices cut and turned for every revolution of the spiral cutters. The angles made by the returning traveling deflectors of the series with the draft-line are substantially equal to the oblique angles formed by the spiral cutters to said line. Or, in other words, if the shares or the cutters cut and turn the furrow-slices on lines at an angle of fifteen (15) degrees with the draft-line, the returning traveling deflectors will make like angles to said line The plow, when in operation, makes a wide cut of equal depth composed of furrow-slices laid obliquely across the strip cut by same. Each revolution of the plow begins a furrow slice at the end toward which the mold-board shares or the helicoidal cutter are axially-inclined, and finishes a slice at the other end of said shares or the cutter,— or, in other words, begins and ends a slice when the number of revolutions equals the number of spiral rounds of shares or cutters composing the plow. After completing the cut, there remains a wedge-shaped section of unbroken soil beyond the cut of the last share or cutter. At this point I pivotally mount a bifurcated hanger, 92 (see Figs. 1 and 16) on the axle of the plow-shaft concentrically with the axis of the cutters, and on the free end of said hanger a horizontally, pivotally-adjustable disk-plow, 93, designed to cut a straight furrow in the line of draft intersecting the oblique furrows cut by the series of shares or cutters. This disk-plow has its normally inclined plane of rotation substantially parallel with the axial inclination of said cutters to the plow-shaft, adjustable by means of an annular, radially-toothed jaw, 94, integral with the hub-bearing 95 of said disk-plow. It has also a second or like jaw, 96, on the free end of said hanger and each jaw is respectively adapted to adjustably engage each other. Said jaw 94 has a vertically threaded bolt, 97, permanently fixed therein, and penetrating jaw 96; and a nut, 98, having a tubular formed portion, 99 see Figs. 2 and 3, and a lower-end screw-threaded portion, 100, adapted to screw onto bolt 97, thus adjustably securing the disk-plow to its hanger 92.

The hanger, 101, is provided with a horizontal portion and a pendent portion on each end thereof. Said hanger has one end pivotally secured in said tubular portion 99 of said nut by a screw-threaded set bolt 102 substantially concentric with the horizontal adjustment of said disk-plow on the free end of hanger 92. The horizontal portion of hanger 101 extends laterally rearward from the pivotal portion, 99, which lies in the vertical plane of the axis of the said disk-plow. This horizontal portion forms an acute angle with said plane and spans the disk-plow to a point over the inclined concave face thereof. There a collar 103 is made vertically-adjustable on said pendent portion by a screw-threaded set bolt 104, to which collar is secured a pendent leaf-spring 105 for holding a common mold-board 106 yieldingly against the concave-face of the disk-plow. Said mold-board is as an auxiliary to said plow in turning the soil, and is vertically and horizontally adjustable on the free pendent end of the hanger 101 on the concave face of the said disk-plow, and also concentrically adjustable simultaneously with the aforesaid adjustment of said plow on the free end of the hanger 92. The vertical plowing relations of said disk-plow with the ground are regulated by a hand-lever 107 (see Figs. 1 and 20) and its rock-shaft 108 pivoted or fulcrumed in bracket 109, 109'. The former has a toothed-segmental plate 110 bolted to the rear flange 17' of said plow-beam convenient to the operator's seat 21. The rock-shaft extends therefrom parallel with said flange or beam to a point near the end thereof, where it is pivoted in a bracket 109. This bracket is secured to said flange by bolts 111, 111', and pivotally connected to the hanger 92 by a pivoted link 112 connecting with the hanger by a pivotal bolt 113. The hanger, 92, is outwardly curved from its pivotal attachment concentric with the axis of the shares or cutters; and hanger 83', of the carrier-frame, is generally bifurcated and curved inwardly from its attachment to said axis to make room between the hangers for a limited horizontal adjustment of the inclined disk-plow 93. This curve also permits a horizontal sweeping return movement of the traveling deflectors 81' for leveling the soil turned by said disk-plow. The vertical plane of the axis of the pivotal bolts 85, 85' of the endless-chain carrier-frame lies substantially in the normal vertical plane of the axis of the said disk-plow 93.

I desire that special notice be given to the peculiar devices now about to be described for rolling down stubble, weeds, etc, in front of the shares or the cutters in suitable condition to be covered over with the furrow-slices cut and jointly turned by the cutters and the traveling deflectors hereinbefore described. I wish also to call attention to the means for gaging the depth or penetration in the soil of said cutters and for lifting the entire series of shares or cutters out of the ground and thence transporting the machine on the weed-roller, 114. For this purpose I provide a pair of bifurcated push-bars, 115, 115', separately pivoted concentrically with the axis of said cutters on each end of the axle 8 of the plow-frame hereinbefore noted and referred to. Said push-bars are provided at their free ends with the pivotal sleeves, 116, 116', pivotally secured in sockets, 117, 117', in the free ends of said bars and pivoted slidably-horizontally on the straight end portions of the bail, 118, 118'. Thus they permit a flexible, vertical, radial movement of the ends of said roller and thereby enable the weed-roller to conform to the constantly changing inequalities in the surface of the ground. Said bail is bent back on itself at each end thereof (see Fig. 14) forming axial pivots 119, 119' journaled in bearings 120, 120' upon which the weed-roller revolves. This roller has a cavity, 121, for lubricants, accessible by means of a screw-threaded plug 121'. The pivots are provided with a right and left screw-threaded portion 122, 122', penetrating said cavity and respectively adapted to gradually feed lubricants outwardly therefrom around said pivots. The bail also has a horizontal portion, 123, parallel with the axis of said roller, and substantially parallel with the axis of the shares or cutters and radially-adjustable in the segmental guides 13, 13' (before described, in connection with the plow-frame) for guiding said bail radially to said axis. The radial vertical adjustment of said weed-roller is effected by a bell-crank hand-lever 19', which is provided with a thumb-latch-and-locking-connection with a toothed segmental plate on bracket 19 in which said lever is pivoted This bracket is, in this instance, firmly secured on the top of the tubular vertical pivot 18, which in some machines will be secured to the draft-bar by the screw-tapped center bolt 15, hereinbefore noted. To the shorter arm of said hand-lever 19 is pivoted a link or loop (123' Figs. 1 and 11) over and embracing the draft-bar 20ª and pivotally secured to the straight horizontal portion of said bail 123. By these means the operator of the machine can adjust said roller vertical-radially to the axis of said shares, thereby regulating the penetration of the shares or cutters in the ground, and, in some machines, lifting them out of the ground and thence transporting the machine on the roller. And still further, by rotating the hand-wheel shifting mechanism, the axial line of the cutters or the shares may be swung obliquely to the draft-line, and, simultaneously therewith, automatically adjust the roller longitudinally to positions of progression corresponding to the draft-line. And, also, simultaneously automatically adjust said rudder-carrying wheels to parallel lines of travel corresponding to said line.

While I prefer, as a rule, to employ rudder-carrying wheels for conveniently adapting my machine to wide ranges of service in various conditions of soil, I have dispensed with said wheels in some machines. But I use the weed-roller as a substitute for the wheels in gaging the penetration of the shares and the transportation of the machine. And the trailing disk-plow may also be dispensed with in some machines, as illustrated in Figs. 36 and 37. In these drawings I show one of my machines of about four to five feet plowing capacity and consisting of the shares or cutters C endless-chain system of friction wheels 81, traveling deflectors 81', weed-roller 114 and truss-rods 32, 32', which are substantially as before described. But the bifurcated hangers, 83, 83′, supporting said system in this machine, are straight instead of curved from their attachment to the axle of said shares to their union with brackets 75, 85′, before described, and the rudder-carrying wheels B, B in this machine are dispensed with. The hand-lever 19$^a$ in this machine for adjusting the roller 114 is fulcrumed or pivoted in bracket 19$^b$. The bracket has a toothed segmental-plate 19$^c$ and is secured on the draft-bar 20$^b$ by the central pivotal-bolt 15. Said hand-lever, 19$^a$, is provided with a short arm pivoted to link 125. This link is loosely pivoted to said bail at 123$^a$, and is also provided with a thumb-latch-and-pawl-connection 126. And a short link 127 is pivoted in the uppermost end of said lever adapted to clasp or inclose said thumb-latch and thereby hold the pawl 128 from engaging the toothed plate 19$^c$, thus permitting said roller to conform to the constantly changing inequalities in the surface of the ground and consequently to the unrestrained penetration of the shares in the ground. Also, in lifting the shares or cutters of this machine, and the next to be described, out of the ground: to do this the operator will grasp the lever, 19$^a$, releasing its pawl 128 from its engagement with the toothed segmental-plate, 19$^c$, and thrust it forward, at the same instant starting his team. Thus, by the united effort of the operator and the team, the plow will be raised out of the ground by the leverage of the axially-pivoted push-bars, 115, 115′, jointly acting on the roller 114 as the fulcrumed point thereof, over which the axis of the mold-board shares will be raised to substantially a vertical position parallel with the axis of said roller as seen in Figs. 37 and 39.

In order to impart an automatic longitudinal movement to said roller and its bail upon changing the axial-line of the shares or the cutter before described, I provide in this machine an eye or radially-slidable collar, 129. This collar is secured on said bail and radially slidable on the segmental guide-rod 130 struck from the axis of said shares. Said rod has its ends secured in the draft-bar 20 and to the guide-bracket 30 by screw-thread-and-tapped bolts 31$^a$, 31$^b$. It is adapted in this machine to move said bail and roller longitudinally and simultaneously with the shifting of the oblique axial-line of the shares to the draft-line. This movement is effected by adjusting the tongue to a series of holes, 131, by a pin, 131′, in the draft-bar segment 14, before described. In this machine, and in the one now to be described, the lower brackets 2$^a$, 2$^a$′ (before noted) extend upward even with the top of the flanges of the plow-beam to the ends of which they are secured by retaining-bolts 132, 132′ through ears or projections 133, 133′ on said brackets substantially as shown.

In Figs. 38 and 39 I illustrate one of my two to three feet machines in one of its simple forms of construction or organization stripped of all its auxiliary elements, hereinbefore described, except the weed-roller 114 and its bail 123. The roller, in this machine, is automatically adjustable longitudinally in connection with the oblique adjustment of the axial-line of the shares or cutters, substantially as before described. But in this machine the automatic adjustments are effected by a pair of arms or projections, 134, 134′, welded or otherwise secured to said bail, and adapted to engage or contact with the curved or segmental portion of the draft-bar, 20$^b$. This arrangement will effect said adjustment automatically accordingly as the pin 131 and the tongue 29 or the draft bar are shifted to any one of the series of holes, 131′, in the segment 14 of the draft-bail before described. This machine is designed for the more arid sections of the country where the normal state of the ground is comparatively a dry one during the plowing period,—therefore, the carrier-frame and its system of friction-wheels and deflectors may be dispensed with. The machine, the bail and its roller, as shown in these drawings, are adjusted to their normal positions for transporting the machine. Should the roller be eliminated, for any cause whatever, then the machine will be trundled from place to place on its spiral shares or cutters with impunity. Moreover, this combination is well adapted for a span of light weight draft animals.

While I have hereinbefore referred to animal-power for drawing or operating the machine, it is obviously apparent that steam or electricity can be conveniently employed as the motive-force by making a few minor changes in the construction of the connecting parts with the power. Minor changes may also be made in the form of the parts while their essential features are retained and the obvious intent and spirit of the invention embodied. Hence, I do not desire to be limited to the exact form of all the parts as shown, reserving the right to vary therefrom.

What I claim is:

1. In a revolving plow, the combination, of a shaft; a spiral groove around the shaft; a series of spirally-constricted concavo-convex mold-board shares, screwed into the groove, substantially as described.

2. In a plowing-machine, the combination, of a beam; a depending bracket, secured to each end of the beam; an axle, secured at each end in the depending brackets; a shaft journaled on the axle; a spiral groove around the shaft; a continuous spiral-line series of spirally-constricted mold-board shares, screwed into the groove, substantially as described.

3. In a plowing-machine, the combination, of a beam; a depending bracket, secured to each end of the beam; an axle, secured at each end to the depending brackets; a revolving shaft, having a spiral groove, journaled on the axle; a continuous spiral-line series of spiral-cutting shares, screwed into the groove forming substantially, a continuous share, adapted to cut and turn oblique furrow-slices and restrict the plowing-machine to the draft-line, substantially as described.

4. In a plowing-machine, the combination with an adjustable beam, mounted normally to the draft-line; an upper and lower bracket, secured to each end of the beam; an axle secured in each depending bracket; a revolving plow-shaft, journaled on the axle, supporting a continuous spiral-line series of spirally-constricted mold-board shares, forming a continuous share, carried by the beam; a pair of separately mounted carrying-wheels, provided with a mechanism, secured in the upper and lower brackets for varying the height at which said beam may be carried, and also with means, substantially as described, for varying the axial-line horizontally of both of said wheels, substantially as set forth.

5. In a rotary plow, the combination substantially as hereinbefore set forth, with an adjustable beam mounted normally to the draft-line, a bracket secured at each end of the beam and depending therefrom, an axle secured in said brackets substantially parallel with the beam, of a shaft journaled on said axle supporting a continuous spiral-line of integral mold-board shares forming practically a helicoidal cutter adapted to cut and turn oblique soil-furrow-slices, a draft-bail secured at each end to the axle, a tubular pivot on the beam, a segment in said bail struck from the center of the tubular-pivot, a tongue pivotally secured on the pivot, and means for adjusting the tongue on the segment.

6. In a plow, a revolving plow shaft, a spiral groove around said shaft, a spiral mold board share adapted to screw into and out of said groove, the share composed of sections whose opposite ends have a V-shaped groove and a V-shaped bevel, respectively adapted to fit into each other to form a continuous share, the share being of concavo-convex form on its lines and having its periphery beveled to a sharp edge on its convex side, substantially as described.

7. In a revolving plow, the combination, of a shaft; a spiral groove around the shaft, a continuous spiral cutting share, consisting of a series of spirally-constricted mold-board shares, each mold-board share composing the series having its radial-section ends respectively, provided with a V shaped grooved end, and a V shaped beveled end, the sections screwed into the spiral-groove, each end share of the series having its outer sectional end provided with a curve from its periphery down to the shaft, and the peripheral-section of the entire series including the curved ends beveled to a sharp edge on the convex side, substantially as described.

8. A spirally constricted mold-board share for screwing on and off a spiral groove on a revolving-plow shaft, of concavo-convex form on its radial lines from its point of attachment in the spiral groove, and its peripheral section beveled to a sharp edge on its convex side, the said mold-board share having one of its sectional ends provided with a V shaped grooved end, and its other sectional end cut-away on a curved or circular line down to the shaft, and the cutaway section beveled on the convex side to a sharp edge, substantially as set forth.

9. In a plowing-machine, the combination with a frame; an axle carried by the frame; a shaft rotative on the axle; an axially inclined spiral groove cut on the shaft; an axially inclined helicoidal cutter, screwed into the groove; a peripheral section, beveled to a sharp edge on the convex side of the helicoidal cutter, the said helicoidal cutter being adapted in its soil and sod cutting screw-action, to restrict the plowing-machine to the draft-line, substantially as set forth.

10. In a plowing-machine, the combination substantially as hereinbefore set forth, with an adjustable frame mounted normally to the draft-line; a shaft journaled substantially parallel with the frame supporting a continuous spiral-line of axially-inclined, mold-board shares, forming practically a helicoidal cutter, of an adjustable draft-bar, pivoted on said frame, a tongue secured to the bar, a pair of truss-rods having king-posts supporting the same to strengthen the tongue against lateral strain when turning the plowing-machine.

11. In a plowing-machine, the combination, substantially as hereinbefore set forth, with an adjustable frame mounted normally to the draft line, a shaft journaled substantially parallel with the frame, supporting a continuous spiral-line of axially-inclined mold-board shares, forming substantially a helicoidal cutter, of an adjustable draft-bar and tongue pivoted on the frame, a pair of truss-rods secured thereon to strengthen the tongue against lateral strain, an upper and a lower bracket secured at each end of said frame, vertical, pivotal-shafts secured to said upper and lower brackets; rudder-lever brackets slidably-adjustable, vertically, and pivotally adjustable horizontally, mounted on each of the vertical, pivotal-shafts, stub-axles pivoted to each of the said rudder-lever brackets, rudder-carrying wheels axially mounted on the stub-axles, said rudder-lever brackets provided with means for adjusting the brackets and wheels on the pivotal-shafts.

12. The combination with a frame mounted normally to the draft-line, and obliquely adjustable to said line, embodying an axle substantially parallel with the frame, of a shaft journaled on said axle, an accessible cavity in the shaft and around said axle for lubricants, a continuous spiral series of integral, axially-inclined spiral cutting, moldboard shares secured on said shaft, adapted in their soil-and-sod-cutting screw-action to restrict the plow to the draft-line, substantially as set forth.

13. In a plowing-machine, the combination substantially as hereinbefore set forth, with an adjustable frame mounted normally to the draft-line, embodying an axle substantially parallel with the frame, a shaft journaled on the axle, an accessible cavity in the shaft and around the axle for lubricants, a continuous spiral-line series of axially-inclined spiral cutting shares secured on the shaft; of an adjustable draft-bar-and-tongue pivoted on the frame, a driver's seat adjustable on said bar, upper and lower brackets secured on each end of the frame, vertical pivotal-shafts secured to the brackets, rudder-lever brackets pivoted on the shafts provided with vertical flanges and means for slidably adjusting the rudder-lever brackets vertically, and, also with means for pivotally adjusting the brackets horizontally on each of the pivotal-shafts; stub axles having collars pivoted to each of the brackets, rudder-carrying wheels axially mounted on the stub axles, and short braces pivoted to the collars having their free ends adjustably secured to the vertical flanges for adjusting the wheels to various vertically inclined planes of rotation.

14. In a plowing-machine, the combination substantially as hereinbefore set forth, with an adjustable frame mounted normally to the draft line, embodying an axle substantially parallel with the frame, a shaft journaled on the axle, an accessible cavity in the shaft and around said axle for lubricants, a continuous spiral line series of axially-inclined spiral shares forming practically a helicoidal cutter secured on the shaft, of an adjustable draft-bar pivoted on said frame, a driver's seat adjustable on said bar, a foot tiller-lever pivoted concentrically with the bar, rudder-lever brackets, tiller-rods pivotally connecting with the foot tiller-lever with the rudder-lever brackets, rudder carrying wheels axially pivoted to the brackets, whereby the rudder-carrying wheels may be swung horizontally to oblique parallel lines of travel to the right or to the left of the draft-line.

15. In a plowing-machine, the combination substantially as hereinbefore set forth, with an adjustable frame mounted normally to the draft-line, said frame embodying an axle substantially parallel with the frame, a shaft journaled on the axle, an accessible cavity in the shaft and around the axle for lubricants, a continuous spiral line series of axially-inclined spiral shares forming substantially a helicoidal cutter secured on the shaft, of an adjustable draft-bar-and-tongue pivoted on said frame, a guide bracket secured to the tongue, a driver's seat adjustable on said bar, a hand wheel-and-gearing, shifting mechanism journaled in said bar, tongue and guide-bracket, and a locking means therefor operated from the driver's seat, whereby the axial line of the spiral shares is made to swing to horizontally oblique positions to the draft-line, thereby changing the angle at which said shares or cutters enter the ground to the draft-line, and the width of the strip cut and turned by the entire series of spiral shares.

16. In a plowing-machine, the combination substantially as hereinbefore set forth, with an adjustable frame mounted normally to the draft-line, embodying an axle substantially parallel with the frame, a shaft journaled on the axle supporting a continuous series of spirally formed, axially-inclined shares, adapted to cut and turn oblique soil-furrow-slices and restrict the machine to the draft-line, of an adjustable draft-bar-and-tongue pivoted upon the frame, a foot tiller-lever pivoted concentrically with said bar, a foot-latch pivotally mounted on the foot-tiller-lever and penetrating the same for adjustably locking with the draft-bar rudder lever brackets, tiller-rods pivotally connecting the foot-tiller-lever with the rudder-lever brackets, rudder carrying wheels axially pivoted to the brackets, a hand wheel shifting mechanism whereby the independent control of the rudder-carrying wheels by the foot-tiller-lever, and, whereby the automatic control by the draft-bar through the tiller-rods of the rudder-carrying wheels is made complete, by independently and automatically swinging said wheels to parallel lines of travel with the draft-line; as the normal position of said wheels and frame is changed to oblique positions by the foot tiller-lever and the hand-wheel shifting mechanism, respectively.

17. In a plowing-machine, the combination substantially as hereinbefore set forth, with an adjustable frame mounted normally to the draft-line, embodying an axle substantially parallel with the frame, a shaft journaled on the axle supporting a continuous line of spirally-formed, axially-inclined mold-board shares adapted to cut and turn oblique soil furrow-slices and restrict the machine to the draft-line; of an adjustable draft-bar-and-tongue pivoted upon the frame, a foot tiller-lever pivoted concentrically with said bar, a foot-latch pivoted upon said tiller-lever and penetrating the same for adjustably locking said lever with the draft-bar, rudder-lever brackets, rudder carrying wheels, axially pivoted to the brackets, tiller-rods, automatically connecting the foot tiller-lever and the draft-bar with the rudder-lever brackets, whereby the operator of the machine can release the latch from its engagement with said bar, thereby breaking the automatic connections of the tiller-rods with the draft-bar, and the rudder-carrying wheels, and then, independently of said bar controlling the line of travel of both of said wheels parallel with each other obliquely to the draft-line.

18. In a plowing-machine, the combination substantially as hereinbefore set forth, with an adjustable frame mounted normally to the draft-line, embodying an axle substantially parallel with the frame; a revolving shaft journaled on said axle supporting a continuous line of spirally-formed, axially-inclined mold-board shares adapted to cut and turn oblique soil furrow-slices and restrict the plowing machine to the draft-line; of a pair of separately mounted rudder-carrying wheels provided with a hand-lever mechanism for each of the wheels for varying the height vertically at which the frame may be carried, and also with means, including a foot tiller-lever and adjusting means therefor, for varying the axial-line horizontally of both of said wheels to oblique parallel lines of travel to the draft line, the wheels being simultaneously operative by the hand-levers and the foot tiller-lever, respectively.

19. In a plowing-machine, the combination substantially as hereinbefore set forth, with a shaft adjustable to the draft line, an axially inclined helically formed groove, cut on the shaft, of a continuous axially inclined helicoidal cutter screwed into the groove.

20. In a plowing-machine, the combination substantially as hereinbefore set forth, with an adjustable frame mounted normally to the draft line and embodying an axle substantially parallel with the frame; a shaft journaled on the axle, an axially-inclined, helically-formed groove around the shaft, and screwed thereon a continuous series of axially-inclined, integral, spirally-formed shares; of a draft-bar pivoted on said frame, a foot tiller-lever pivoted concentrically with the bar, a foot-latch pivoted on said lever, adapted to adjustably engage with said bar, adjustable rudder-lever brackets secured to each end of the frame, tiller-rods pivotally connecting said foot tiller-lever with the rudder-lever brackets, separately mounted, rudder-carrying wheels axially pivoted to said brackets and provided with vertically adjusting mechanism substantially as shown and described.

21. In a plowing-machine, the combination substantially as hereinbefore set forth, with an adjustable frame mounted normally to the draft-line, of a shaft journaled in the frame, a continuous spiral line of axially-inclined shares secured on said shaft, forming substantially a helicoidal cutter; a pair of separately mounted, vertical, pivotal-shafts secured to each end of said frame; adjustable rudder-lever brackets axially pivoted on the shafts, stub axles pivoted to the brackets, rudder-carrying wheels axially mounted on the stub-axles, and means for inclining said wheels to various vertically-inclined planes of rotation.

22. In a plowing-machine, the combination substantially as hereinbefore set forth, with an adjustable shaft, an axially-inclined, helically-formed groove around the shaft and screwed thereon a continuous spiral line of axially-inclined shares, forming substantially a helicoidal cutter, of an endless chain composed of pivoted links, a carrier-frame for the chain having flanged guideways, a series of friction wheels journaled concentrically with the pivoted links, adapted to roll or travel in the flanged guideways for holding the chain to a right line movement.

23. In a plowing-machine, the combination substantially as hereinbefore set forth, with an adjustable shaft, an axially-inclined, helically-formed groove around the shaft, a continuous spiral line of axially-inclined shares screwed thereon, forming substantially a continuous, helicoidal cutter; of an endless chain composed of pivoted links, a carrier-frame for the chain having flanged guideways, a series of friction wheels journaled concentrically with the pivoted links, adapted to roll or travel in the flanged guideways for holding the chain to a right line movement, and a plurality of brackets integral with the links carried by the chain.

24. In a plowing-machine, the combination substantially as hereinbefore set forth, with an adjustable shaft, an axially-inclined, helical groove formed around the shaft and screwed thereon a continuous spiral line of axially-inclined shares forming substantially a continuous helicoidal cutter; of an endless chain composed of pivoted links, a carrier-frame for the chain having flanged guideways, a series of friction wheels journaled concentrically with the pivoted links, adapted to roll or travel in flanged guideways for holding the chain to a right line movement, a plurality of brackets integral with the links carried by said chain, the brackets having arms parallel with the chain, friction wheels adjustable on said arms, and also arms substantially parallel with the axial inclination of the shares or cutters, traveling deflectors having sharp edges adjustable on said arms, automatically moved or operated by the screw action of the cutters.

25. In a plowing-machine, the combination substantially as hereinbefore set forth, with an adjustable shaft, an axially-inclined, helical groove, formed around the shaft and screwed thereon, a continuous spiral line of axially-inclined shares forming substantially a helicoidal cutter; of an endless chain composed of pivoted inks, a carrier-frame for the chain having flanged guideways, a series of friction wheels journaled concentrically with the pivoted links, adapted to roll or travel in the flanged guideways for holding the chain to a right line movement, a plurality of brackets, integral with links carried by said chain, the brackets having arms parallel with the chain, friction wheels adjustable on said arms, a leaf-spring secured to each of the arms parallel with the axial inclination of said shares or cutters, traveling deflectors having sharp edges adjustable on said leaf-spring for holding the sharp edges yieldingly against the concave faces of the shares or cutters and moved or operated by the screw action of said cutters.

26. In a plowing-machine, the combination substantially as hereinbefore set forth, with an adjustable shaft, an axially-inclined, groove cut on the shaft and screwed thereon, a continuous spiral line of axially-inclined, spiral shares forming substantially a helicoidal cutter; of an endless chain composed of pivoted links, a carrier-frame for the chain having flanged guideways, a series of friction wheels journaled concentrically with the pivoted links adapted to roll or travel in flanged guideways for holding the chain to a right line movement, a plurality of brackets integral with links carried by said chain, the brackets having arms parallel with the chain, friction wheels adjustable on said arms, a leaf-spring secured to each of the arms parallel with the axial inclination of said shares or cutters, traveling deflectors having sharp edges adjustable on said leaf-spring for holding said edges yieldingly against the concave faces of the shares or cutters, adapted to pare off the adhering soil therefrom, the deflectors extending laterally rearward beyond the rear edges of the cutters and coöperating with said cutters in turning the soil furrow-slices delivered thereto by the helicoidal cutters.

27. In a plowing-machine, the combination substantially as hereinbefore set forth, with a rotary-shaft having an axially-inclined, helically-cut groove and screwed thereon a continuous, axially-inclined, helicoidal cutter; of an endless chain provided with a carrier-frame having flanges forming guideways for the chain, a plurality of link-supported brackets carried by said chain, a plurality of friction-wheels and traveling deflectors, said deflectors having sharp edges adjustably mounted on the brackets, said wheels and deflectors bearing against the convex and the concave faces, respectively, of said axially-inclined, helicoidal cutters, the wheels holding the sharp edges of the deflectors flush against the concave, helical faces of the cutters and simultaneously moving the entire system of traveling deflectors by the screw action of said cutters.

28. In a plowing-machine, the combination substantially as hereinbefore set forth, with a plow-shaft obliquely adjustable to the draft-line, an axially-inclined, helically-cut groove around the shaft, and screwed thereon a continuous, axially-inclined, helicoidal cutter; of an endless chain supported in a carrier-frame, provided with flanges forming guideways, adjustable brackets on each end of the frame for adjusting the slack of said chain; the brackets being provided with segmental flanges forming guideways for the movement of the endless chain, a plurality of brackets carried by the chain, a plurality of friction wheels and traveling deflectors adjustable on said brackets, and operated by the screw action of the cutters.

29. In a plowing-machine, the combination substantially as hereinbefore set forth, with a plow shaft obliquely adjustable to the draft-line, an axially-inclined, helical groove around the shaft, and screwed thereon continuous, axially-inclined, helicoidal cutters; of a carrier frame, an endless chain supported in the carrier-frame, adjustable end brackets on the carrier frame, a system of friction wheels and traveling deflectors carried by the chain, a pair of separately pivoted hangers pivoted substantially concentrically with the axis of the plow-shaft having their free ends adjustably secured to the adjustable end brackets of the carrier-frame, and means of radially adjusting the system of friction wheels and traveling deflectors on the convex and concave faces of the axially-inclined, helicoidal cutters, respectively, to the axis of said cutters; said means also adjusting the deflectors to and from the freshly turned soil for leveling and reducing the surface soil to a fine tilth.

30. In a plowing-machine, the combination substantially as hereinbefore set forth, with a shaft obliquely adjustable to the draft-line, an axially-inclined, helical groove cut on said shaft, a continuous axially inclined helicoidal cutter screwed thereon; of an endless chain, friction wheels and deflectors carried by the chain, a carrier-frame, end brackets on the carrier frame, a pair of separately mounted hangers pivoted concentrically with the axis of the helicoidal cutter and having their free ends adjustably-secured to the end brackets of the carrier-frame permitting the disengagement of the system of friction wheels and deflectors with the cutters, and the suspension of the same out of operative engagement therewith.

31. In a plowing-machine, the combination substantially as hereinbefore set forth, with an adjustable shaft, an axially-inclined helical groove cut on the shaft, and screwed thereon, a continuous axially-inclined, helicoidal cutter, of an endless chain supported in a carrier-frame, a plurality of link-supported brackets, a plurality of friction wheels and deflectors carried by the brackets, the deflectors having sharp edges, a variable bolt-and-slot connection in the brackets for adjusting the traveling deflectors to and from said shaft, and, to their proper working radial angles on the concave faces of the cutters, and a second variable bolt-and-slot connection in the brackets for adjusting the friction wheels against the convex faces of the cutters, said wheels holding the sharp edges of the traveling deflectors flush against the concave faces of the cutters, the wheels rolling on the convex faces and thereby moving the entire system by the screw action of the cutters.

32. In a plowing-machine, the combination substantially as hereinbefore set forth, with an adjustable frame, of a continuous spiral axially-inclined, helicoidal cutter adapted to cut and turn oblique furrow-slices; of a hanger or trailing-bar pivoted to the plow-frame substantially concentrically with the axis of said cutter, a vertically inclined disk-plow horizontally adjustable on the free end of the hanger, a deflecting mold-board adjustable on the concave face of said inclined disk-plow, and also horizontally and vertically adjustably pivoted concentrically with the first mentioned adjustment of said disk-plow, on the free end of the hanger, a hand-lever, and an adjusting means therefor, for regulating the penetration of the disk-plow.

33. In a plowing-machine, the combination substantially as hereinbefore set forth, with a frame, of a continuous, axially-inclined, helicoidal cutter journaled in the frame adapted to cut and turn oblique furrow-slices and restrict the machine to the draft-line, of a trailing weed-roller, an accessible cavity in the roller for lubricants, and means for adjusting said roller radially to the axis of the cutters, and also with means for automatically adjusting the roller longitudinally parallel with said axis, a vertically-inclined, trailing disk-plow pivoted to the plow-frame concentrically with the axis of the cutters, for cutting a straight furrow in the line of draft intersecting the oblique furrows cut by the helicoidal cutter, and, means for adjusting the disk-plow to its operative working relations with the ground.

34. In a plowing-machine, the combination substantially as hereinbefore set forth, with an adjustable frame, a continuous, axially-inclined, helicoidal cutter adapted to cut and turn oblique furrows, and restrict the machine to the draft-line, of a trailing weed-roller, an accessible cavity in the roller for lubricants, means for adjusting the roller radially to the axis of said cutter in front thereof, a system of friction wheels, a system of deflectors, an endless chain, a carrier-frame for the chain, supporting the system of friction wheels and traveling deflectors, adjustable in the rear of the cutter, an said chain moved or operated by the screw-action of the cutter, and, a trailing disk-plow cutting a straight furrow, and adjusting means for the same.

35. In a plowing-machine, the combination substantially as hereinbefore set forth, with an adjustable frame, of a continuous, axially-inclined, helicoidal cutter, adapted to cut and turn oblique furrows and restrict the machine to the draft-line, a trailing weed-roller, an accessible cavity in the roller for lubricants, means for adjusting the roller radially to the axis of the helicoidal cutter in front thereof, adapted to trail down weeds and the like, an endless chain, a carrier-frame for the chain, a system of friction wheels, and traveling deflectors, moved or operated by the screw action of the cutters, the deflectors coöperating with the spiral cutters in covering up said weeds; a pair of separately mounted, rudder-carrying wheels provided with means for varying the height at which the shaft and its cutters may be carried.

36. In a plowing-machine, the combination substantially as hereinbefore set forth, with an adjustable frame, of a continuous axially-inclined, helicoidal cutter rotatively journaled in said frame, adapted to cut and turn oblique furrows, and restrict the machine to the draft-line; of a trailing weed-roller, an accessible cavity in the roller for lubricants, and means for adjusting the roller radially in front of the axis of the helicoidal cutter for trailing down weeds, etc., said means also serving to gage the penetration of the cutter in the ground, and for lifting said cutter out of the ground for transportation, an endless chain carrier-frame provided with a system of friction wheels and traveling deflectors, radially adjustable in the rear of the cutter and moved or operated by the screw action of the cutter.

37. In a plowing-machine, the combination substantially as hereinbefore set forth, with an adjustable plow shaft supporting a continuous, axially-inclined series of spiral shares or cutters; of a trailing weed-roller, means for adjusting the roller radially in front of and substantially parallel with the axis of said shares or cutters, and with a means for effecting an automatic, longitudinal adjustment of said roller, and also with means for permitting a radial, vertical, flexible movement of the roller; whereby said roller can automatically accommodate itself to the constantly changing inequalities in the surface of the ground.

38. In a plowing-machine, the combination substantially as hereinbefore set forth, with an adjustable plow-shaft supporting a continuous series of axially-inclined, spirally constricted shares, of a trailing weed-roller provided with means for radially and vertically adjusting the roller to the axis of the shares, rudder carrying wheels; a mechanism for adjusting the axial-line of the shares or cutters obliquely to the draft-line, embodying a toothed segment and a hand-wheel operated toothed wheel for the toothed segment, said mechanism, simultaneously, automatically moving said roller to longitudinal positions on lines of progression parallel with the draft-line; and also automatically swinging laterally both of the rudder-carrying wheels to parallel lines of travel corresponding to the draft-line.

39. In a plowing-machine, the combination substantially as hereinbefore set forth, with an adjustable shaft, an axially-inclined, helical groove around the shaft, a continuous series of axially-inclined, spirally-formed cutters screwed on the shaft, of a trailing weed-roller, a bail by which the roller is suspended axially-pivoted in the ends of said roller, the bail having a straight portion, a draft bar, a link over and embracing the draft-bar and pivoted on the straight portion, means for vertically adjusting the bail and roller radially to the axis of the spiral cutters; and mechanism for adjusting the shaft, including a toothed segment, a hand-wheel and locking means substantially as shown, whereupon adjusting the axial-line of the spiral cutters or the shaft from its normal to oblique positions simultaneously therewith, imparts to the roller a longitudinal movement substantially parallel with the axis of the shares and corresponding in its line of progression to the draft-line.

40. In a plowing-machine, the combination substantially as hereinbefore set forth, with an adjustable shaft supporting a continuous axially-inclined, helicoidal cutter; of a trailing weed-roller, a bail by which the roller is suspended pivoted in the ends of the roller, said bail having a straight portion parallel with the axis of said roller, a draft bar, a link over and embracing the draft-bar and pivoted on said straight portion, a draft bail, a pair of separately disposed, segmental guide braces secured to the beam and the draft-bail, respectively, for guiding the roller bail radially to the axis of the helicoidal cutters, and substantially longitudinally parallel with said axis, push bars pivoted concentrically with the axis, pivoted sleeves in the free ends of the push bars and slidably pivoted on the straight end portion of the roller bail, and means for adjusting the roller bail, and roller radially to the axis of the cutters for gaging the depth of penetration in the ground, and also for lifting the entire series of spiral cutters out of the ground, for the transportation of the plowing-machine on the roller.

41. In a plowing-machine, the combination, substantially as hereinbefore set forth, with an adjustable shaft supporting a continuous axially-inclined, helicoidal cutter; of a trailing weed-roller having a cavity for lubricants, and provided with means for automatically adjusting the roller substantially longitudinally parallel with the axis of the helicoidal cutter, and also with means for vertically adjusting the roller radially to said axis in front of the helicoidal cutter; and a system of friction wheels and traveling mold-board deflectors, provided with means for radially adjusting the system to said axis in the rear of the helicoidal cutter.

42. In a plowing-machine, the combination substantially as hereinbefore set forth, with an adjustable shaft supporting a continuous series of axially-inclined, spiral shares; of a trailing weed-roller, a cavity in the roller for lubricants, a bail by which the roller is suspended pivoted in the ends of the roller, straight end portions in the bail, a pair of segmental guide-braces for the bail, push-bars pivoted concentrically with axis of the spiral shares, pivoted sleeves in the free ends of the push-bars, and slidably pivoted on the straight end portion of the bail, means for adjusting the roller radially to the axis of the spiral shares, a beam, a tubular pivot on the beam, a draft-bail segment struck from the center of the tubular-pivot, a tongue pivoted on the tubular pivot, and a means for adjusting the tongue on the draft-bail segment radially with the tubular pivot.

43. In a plowing-machine, the combination, substantially as hereinbefore set forth, with a shaft obliquely adjustable to the draft-line, supporting a continuous series of axially-inclined, spiral cutters, of a trailing weed-roller, a cavity in the roller for lubricants, and a means for adjusting the roller radially to the axis of the spiral cutters, substantially as shown.

44. In a plowing-machine, the combination with a revolving shaft, of an axially-inclined spiral groove around the shaft; an axially-inclined concavo-convex helicoidal cutter, for screwing on and off the shaft; a continuous peripheral section extended at one end down to the shaft and beveled to a sharp edge on the convex side of the cutter, down to the shaft; the cutter being adapted to cut a sloping land-side down into the soil, and turn oblique furrows to the draft-line, substantially as set forth.

45. In a plowing-machine, the combination, of a revolving shaft, an axially inclined helical groove, cut on the shaft, an axially inclined concavo-convex helicoidal cutter, beveled on the convex side to a sharp edge, and, screwed into the groove; the cutter being adapted to cut a sloping land-side, laterally down into the soil, and under oblique furrow slices, and restrict itself to the draft-line, substantially as set forth.

46. In a plowing-machine, the combination, of a revolving shaft, an axially inclined helical groove, cut on the shaft, an axially inclined concavo-convex helicoidal cutter, beveled on the convex side, to a sharp edge, and screwed into the groove; the cutter being adapted to cut a sloping land-side, laterally down into the soil under oblique furrow slices; and, by its spiral lifting-thrust under the slices, causing the soil to part along irregular lines of cleavage horizontally, between the series of cutters, thereby leaving the furrow-bottoms in a porous condition, facilitating the rapid absorption of water into the subsoil, substantially as set forth.

In testimony whereof I affix my signature, in the presence of two witnesses.

JOHN QUINCY ADAMS NEWSOM.

Witnesses:
  FRED L. McGAHAN,
  ADAM F. KULAGE.